(12) United States Patent
Mitchell et al.

(10) Patent No.: US 8,213,156 B2
(45) Date of Patent: Jul. 3, 2012

(54) PARTICLE BASED ELECTRODES AND METHODS OF MAKING SAME

(75) Inventors: Porter Mitchell, San Diego, CA (US); Linda Zhong, San Diego, CA (US); Hermann Vincent, Prilly (CH); Chenniah Nanjundiah, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 345 days.

(21) Appl. No.: 12/620,161

(22) Filed: Nov. 17, 2009

(65) Prior Publication Data

US 2010/0119699 A1 May 13, 2010

Related U.S. Application Data

(62) Division of application No. 10/817,589, filed on Apr. 2, 2004, now Pat. No. 7,791,860.

(60) Provisional application No. 60/486,002, filed on Jul. 9, 2003, provisional application No. 60/498,346, filed on Aug. 26, 2003.

(51) Int. Cl.
*H01G 9/00* (2006.01)

(52) U.S. Cl. ........ 361/502; 361/504; 361/509; 361/512; 361/523; 361/525; 29/25.01; 29/25.03

(58) Field of Classification Search .................. 361/502, 361/503–504, 506–519, 523–525, 528–530; 29/25.01, 25.03

See application file for complete search history.

(56) References Cited

U.S. PATENT DOCUMENTS

| | | | |
|---|---|---|---|
| 3,528,955 A | 9/1970 | Lippman et al. |
| 3,864,124 A | 2/1975 | Breton et al. |
| 4,129,633 A | 12/1978 | Biddick |
| 4,153,661 A | 5/1979 | Ree et al. |
| 4,175,055 A | 11/1979 | Goller et al. |
| 4,177,159 A | 12/1979 | Singer |
| 4,194,040 A | 3/1980 | Breton et al. |
| 4,287,232 A | 9/1981 | Goller et al. |
| 4,313,972 A | 2/1982 | Goller et al. |
| 4,317,789 A | 3/1982 | Groult et al. |
| 4,320,184 A | 3/1982 | Bernstein et al. |
| 4,320,185 A | 3/1982 | Bernstein et al. |
| 4,336,217 A | 6/1982 | Sauer |
| 4,354,958 A | 10/1982 | Solomon |
| 4,379,772 A | 4/1983 | Solomon et al. |
| 4,383,010 A | 5/1983 | Spaepen |
| 4,405,544 A | 9/1983 | Solomon |
| 4,482,931 A | 11/1984 | Yializis |
| 4,500,647 A | 2/1985 | Solomon et al. |
| 4,556,618 A | 12/1985 | Shia |
| 4,808,493 A | 2/1989 | Breault |
| 4,877,694 A | 10/1989 | Solomon et al. |
| 4,895,775 A | 1/1990 | Kato et al. |
| 4,917,309 A | 4/1990 | Zander et al. |
| 5,100,747 A | 3/1992 | Hayashida et al. |
| 5,144,595 A | 9/1992 | Graham et al. |

(Continued)

FOREIGN PATENT DOCUMENTS

EP 0146764 7/1985

(Continued)

*Primary Examiner* — Nguyen T Ha
(74) *Attorney, Agent, or Firm* — Knobbe Martens Olson & Bear LLP

(57) ABSTRACT

A coated electrode is provided for use in energy storage devices. The coated electrode comprises a dry fibrillized polymer that is fibrillized with no processing additives.

21 Claims, 16 Drawing Sheets

U.S. PATENT DOCUMENTS

| | | | |
|---|---|---|---|
| 5,198,313 A | 3/1993 | Juergens | |
| 5,381,303 A | 1/1995 | Yoshida et al. | |
| 5,393,617 A | 2/1995 | Klein | |
| 5,456,000 A | 10/1995 | Gozdz et al. | |
| 5,470,357 A | 11/1995 | Schmutz et al. | |
| 5,478,363 A | 12/1995 | Klein | |
| 5,482,906 A | 1/1996 | Sakai et al. | |
| 5,557,497 A | 9/1996 | Ivanov et al. | |
| 5,593,462 A | 1/1997 | Gueguen et al. | |
| 5,636,437 A | 6/1997 | Kaschmitter et al. | |
| 5,675,553 A | 10/1997 | O'Brien et al. | |
| 5,703,906 A | 12/1997 | O'Brien et al. | |
| 5,707,763 A | 1/1998 | Shimizu et al. | |
| 5,757,675 A | 5/1998 | O'Brien | |
| 5,778,515 A | 7/1998 | Menon | |
| 5,786,555 A | 7/1998 | Saito et al. | |
| 5,840,087 A | 11/1998 | Gozdz et al. | |
| 5,846,675 A | 12/1998 | Sazhin et al. | |
| 5,849,431 A | 12/1998 | Kita et al. | |
| 5,871,860 A | 2/1999 | Frost | |
| 5,879,836 A | 3/1999 | Ikeda et al. | |
| 5,914,019 A | 6/1999 | Dodgson et al. | |
| 5,966,414 A | 10/1999 | O'Brien | |
| 5,973,912 A | 10/1999 | Kibi et al. | |
| 6,022,436 A * | 2/2000 | Koslow et al. | 156/191 |
| 6,031,712 A | 2/2000 | Kurihara et al. | |
| 6,072,692 A | 6/2000 | Hiratsuka et al. | |
| 6,094,338 A | 7/2000 | Hirahara et al. | |
| 6,127,474 A | 10/2000 | Andelman | |
| 6,134,760 A | 10/2000 | Mushiake et al. | |
| 6,136,476 A | 10/2000 | Schutts et al. | |
| 6,150,050 A | 11/2000 | Mathew et al. | |
| 6,159,611 A | 12/2000 | Lee et al. | |
| 6,207,251 B1 | 3/2001 | Balsimo et al. | |
| 6,236,560 B1 | 3/2001 | Ikeda et al. | |
| 6,225,733 B1 | 5/2001 | Gadkaree et al. | |
| 6,246,568 B1 | 6/2001 | Nakao et al. | |
| 6,308,405 B1 | 10/2001 | Takamatsu et al. | |
| 6,310,756 B1 | 10/2001 | Miura et al. | |
| 6,310,759 B2 | 10/2001 | Ishigaki et al. | |
| 6,310,762 B1 | 10/2001 | Okamura et al. | |
| 6,349,027 B1 | 2/2002 | Suhara et al. | |
| 6,397,274 B1 | 5/2002 | Miller | |
| 6,403,257 B1 | 6/2002 | Christian et al. | |
| 6,452,782 B1 | 9/2002 | Otsuki et al. | |
| 6,466,516 B1 | 10/2002 | O'Brien et al. | |
| 6,493,210 B2 | 12/2002 | Nonaka et al. | |
| 6,524,737 B1 | 2/2003 | Tanii et al. | |
| 6,558,841 B1 * | 5/2003 | Nakagiri et al. | 429/218.1 |
| 6,589,299 B2 | 7/2003 | Missling et al. | |
| 6,589,690 B1 * | 7/2003 | Sato et al. | 429/162 |
| 6,614,646 B2 | 9/2003 | Bogaki et al. | |
| 6,697,249 B2 | 2/2004 | Maletin et al. | |
| 6,768,056 B2 | 7/2004 | Fischer et al. | |
| 6,795,297 B2 | 9/2004 | Iwaida et al. | |
| 6,808,845 B1 | 10/2004 | Nonaka et al. | |
| 6,831,826 B2 | 12/2004 | Iwaida et al. | |
| 6,841,594 B2 | 1/2005 | Jones et al. | |
| 6,847,517 B2 | 1/2005 | Iwaida et al. | |
| 6,887,617 B2 | 5/2005 | Sato et al. | |
| 6,906,911 B2 | 6/2005 | Ikeda et al. | |
| 6,914,768 B2 | 7/2005 | Matsumoto et al. | |
| 7,018,568 B2 | 3/2006 | Tierney | |
| 7,061,749 B2 * | 6/2006 | Liu et al. | 361/502 |
| 7,139,162 B2 | 11/2006 | Michel et al. | |
| 7,199,997 B1 | 4/2007 | Lipka et al. | |
| 7,227,737 B2 | 6/2007 | Mitchell et al. | |
| 7,236,348 B2 | 6/2007 | Asano et al. | |
| 7,295,423 B1 * | 11/2007 | Mitchell et al. | 361/502 |
| 7,811,709 B2 * | 10/2010 | Musha et al. | 429/233 |
| 2001/0049050 A1 | 12/2001 | Aragane et al. | |
| 2002/0039275 A1 | 4/2002 | Takeuchi et al. | |
| 2002/0058179 A1 | 5/2002 | Segit et al. | |
| 2002/0081495 A1 | 6/2002 | Nakajima et al. | |
| 2002/0122985 A1 | 9/2002 | Sato et al. | |
| 2002/0136948 A1 | 9/2002 | Missling et al. | |
| 2002/0150812 A1 | 10/2002 | Kaz et al. | |
| 2002/0163773 A1 | 11/2002 | Niiori et al. | |
| 2002/0167782 A1 | 11/2002 | Andelman et al. | |
| 2002/0167784 A1 | 11/2002 | Takatomi et al. | |
| 2003/0157314 A1 | 8/2003 | Penneau et al. | |
| 2003/0165744 A1 | 9/2003 | Schubert et al. | |
| 2003/0175588 A1 | 9/2003 | Zhang | |
| 2005/0064289 A1 | 3/2005 | Suzuki et al. | |
| 2005/0078432 A1 | 4/2005 | Gallay et al. | |
| 2005/0186473 A1 | 8/2005 | Mitchell et al. | |
| 2005/0225929 A1 | 10/2005 | Murakami et al. | |
| 2005/0271798 A1 | 12/2005 | Zhong et al. | |
| 2006/0054277 A1 | 3/2006 | Byun et al. | |
| 2006/0114643 A1 | 6/2006 | Mitchell et al. | |
| 2006/0133012 A1 | 6/2006 | Zhong et al. | |
| 2006/0133013 A1 | 6/2006 | Xi et al. | |
| 2006/0146475 A1 | 7/2006 | Zhong et al. | |
| 2006/0146479 A1 | 7/2006 | Mitchell et al. | |
| 2006/0246343 A1 | 11/2006 | Mitchell et al. | |
| 2007/0122698 A1 | 5/2007 | Mitchell et al. | |
| 2007/0160901 A1 | 7/2007 | Kaun | |
| 2007/0190424 A1 | 8/2007 | Mitchell et al. | |

FOREIGN PATENT DOCUMENTS

| | | |
|---|---|---|
| EP | 1009058 | 6/2000 |
| EP | 1096587 | 5/2001 |
| EP | 1215742 | 6/2002 |
| EP | 1313158 | 5/2003 |
| EP | 1464620 | 10/2004 |
| JP | 04-067610 | 3/1992 |
| JP | 07-201681 | 8/1995 |
| JP | 08-096810 | 4/1996 |
| JP | 2000-200737 | 7/2000 |
| JP | 2000-279777 | 10/2000 |
| JP | 2001-283918 | 10/2001 |
| JP | 2003-012311 | 1/2003 |
| JP | 2003-229124 | 8/2003 |
| JP | 2004-281096 | 10/2004 |
| WO | WO 02/065563 | 8/2002 |
| WO | WO 03/015199 | 2/2003 |
| WO | WO 03/016219 | 2/2003 |
| WO | WO 2006/001847 | 1/2006 |

* cited by examiner

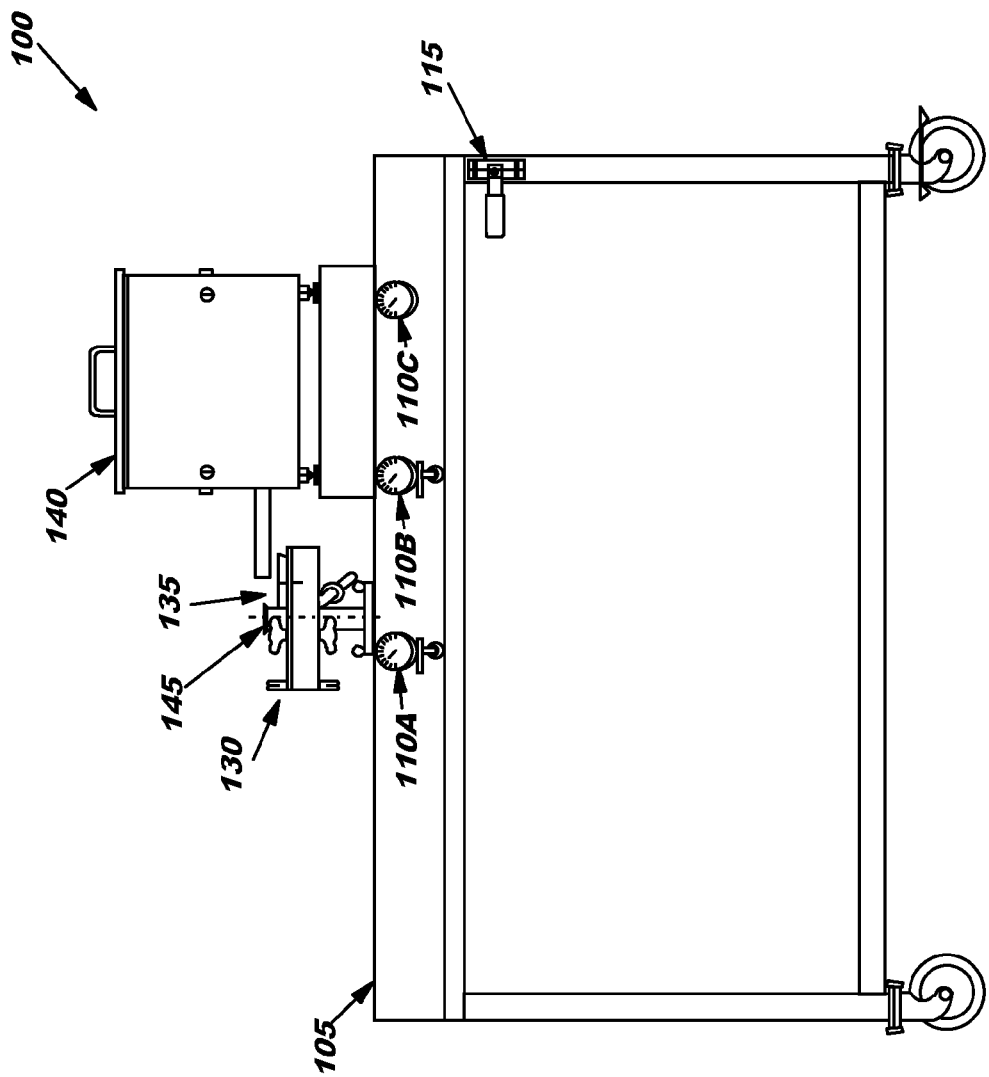

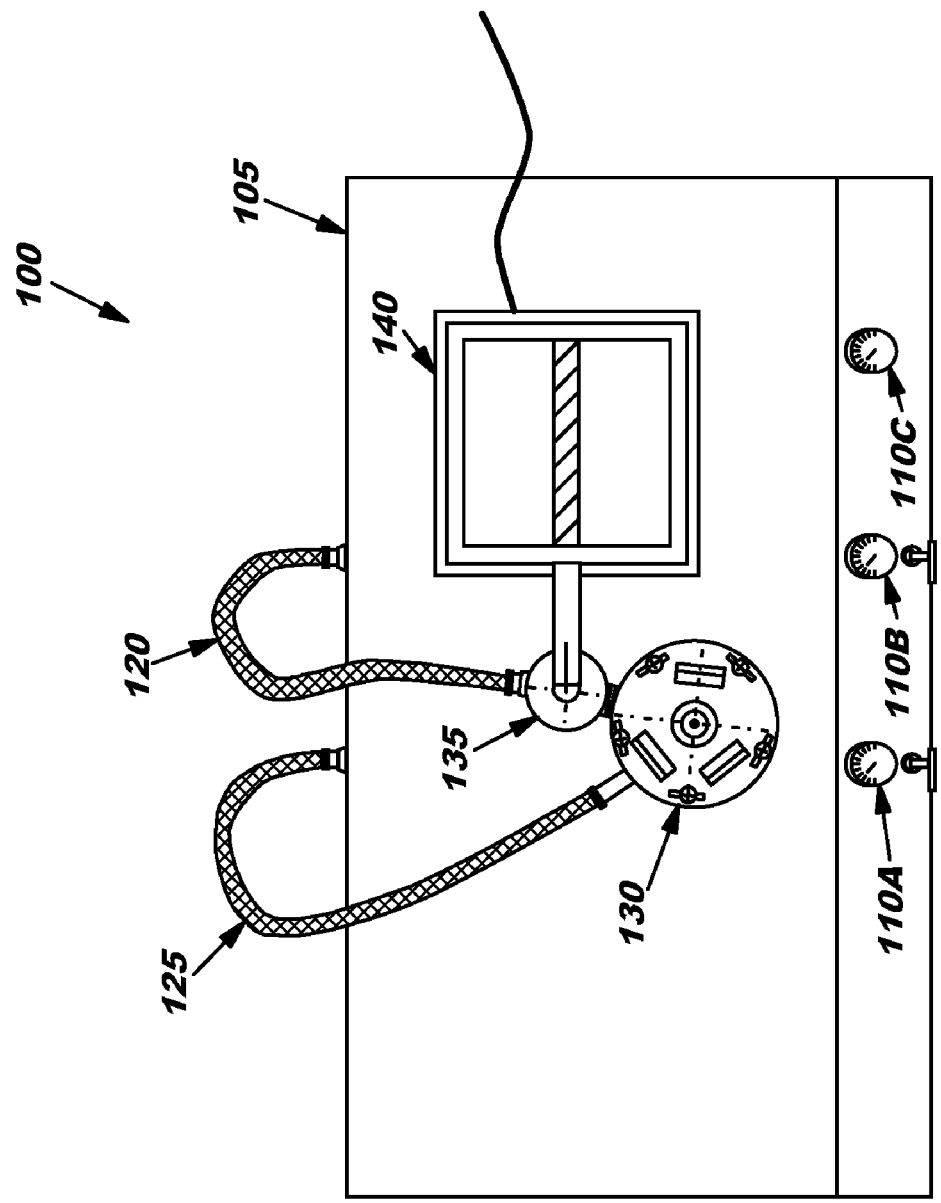

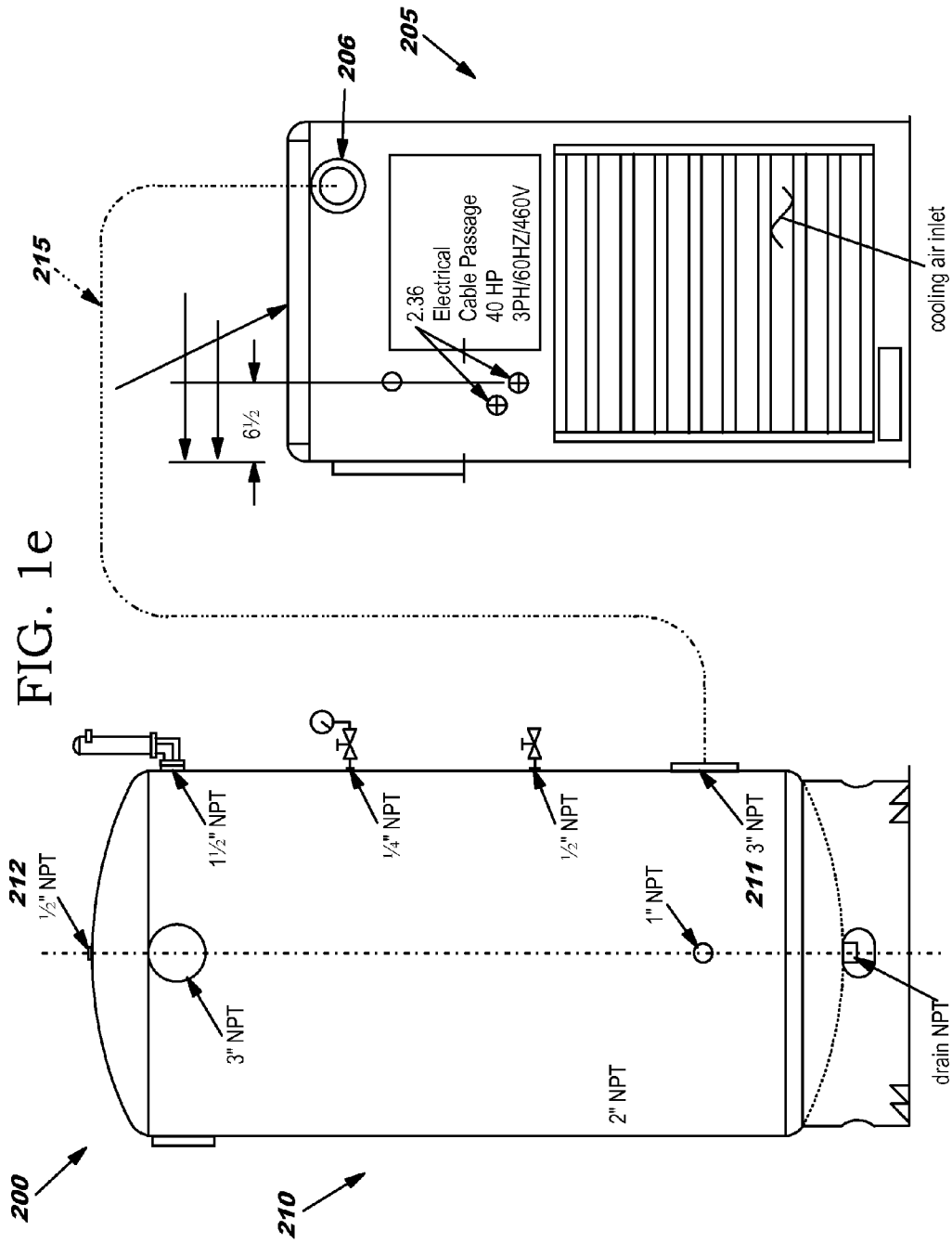

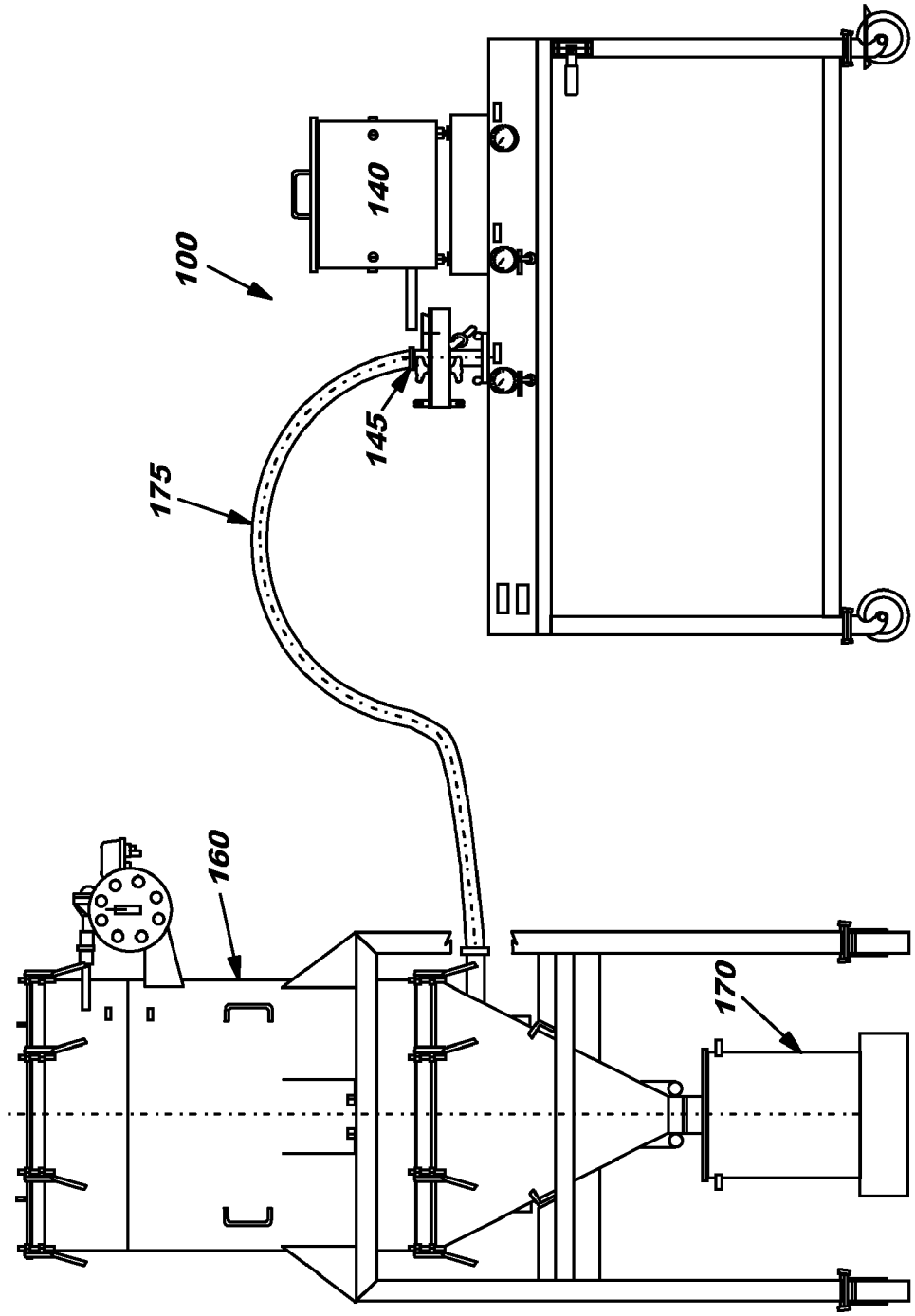

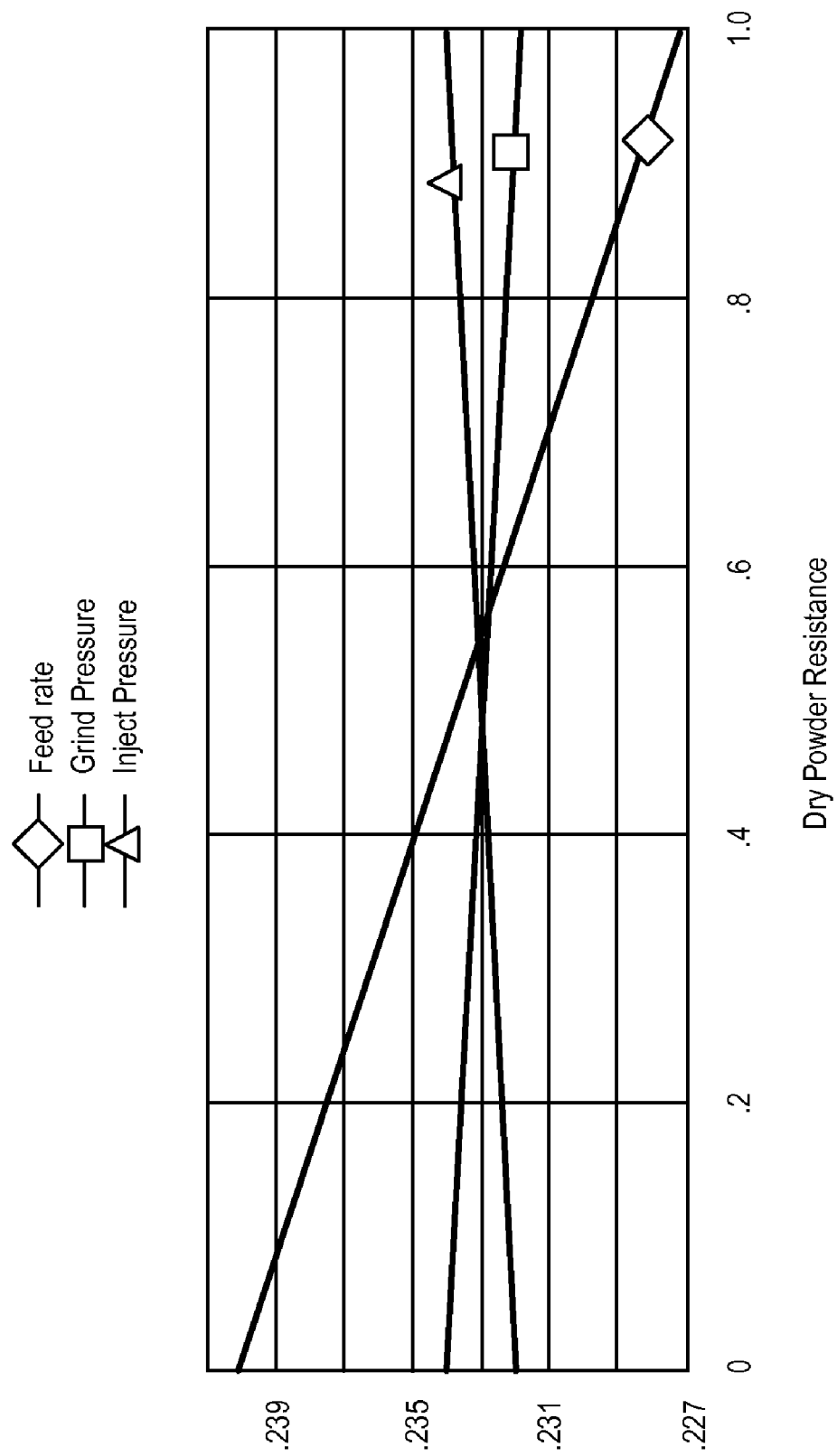

PARTICLE BASED ELECTRODES AND METHODS OF MAKING SAME

RELATED APPLICATIONS

The present application is a divisional application of U.S. application Ser. No. 10/817,589, filed Apr. 2, 2004.

U.S. application Ser. No. 10/817,589 claims the benefit of U.S. provisional application Nos. 60/498,346, filed Aug. 26, 2003, 60/486,002, filed Jul. 9, 2003.

Each of the above-mentioned patent applications is hereby incorporated herein by reference for all purposes.

FIELD OF THE INVENTION

The present invention relates generally to the field of coating of structures for use in energy storage devices. More particularly, the present invention relates to capacitor structures and methods that use dry fibrillized flouropolymers.

BACKGROUND INFORMATION

Double-layer capacitors, also referred to as ultracapacitors and super-capacitors, are energy storage devices that are able to store more energy per unit weight and unit volume than capacitors made with traditional technology.

Double-layer capacitors store electrostatic energy in a polarized electrode/electrolyte interface layer. Double-layer capacitors include two electrodes, which are separated from contact by a porous separator. The separator prevents an electronic (as opposed to an ionic) current from shorting the two electrodes. Both the electrodes and the porous separator are immersed in an electrolyte, which allows flow of the ionic current between the electrodes and through the separator. At the electrode/electrolyte interface, a first layer of solvent dipole and a second layer of charged species is formed (hence, the name "double-layer" capacitor).

Although, double-layer capacitors can theoretically be operated at voltages as high as 4.0 volts and possibly higher, current double-layer capacitor manufacturing technologies limit nominal operating voltages of double-layer capacitors to about 2.5 to 2.7 volts. Higher operating voltages are possible, but at such voltages undesirable destructive breakdown begins to occur, which in part may be due to interactions with impurities and residues that can be introduced during manufacture. For example, undesirable destructive breakdown of double-layer capacitors is seen to appear at voltages between about 2.7 to 3.0 volts. Double-layer capacitor can also provide high capacitance on the order of 1 to 5000 Farads in relatively small form factor housings.

Known capacitor electrode fabrication techniques utilize coating and extrusion processes. Both processes utilize binders such as polymers or resins to provide cohesion between the surface areas of the particles used.

In the coating process, the binder is dissolved in an appropriate solvent, typically organic, aqueous or blends of aqueous and organics, and mixed with the conductive material, such as carbon, to form a slurry. The slurry is then coated through a doctor blade or a slot die onto the current collector, and the resulting electrode is dried to remove the solvent. Among the numerous polymers and copolymers that can be used as a binder in the coating process, most of them suffer from a lack of stability when a subsequent electrolyte solvent is used to impregnate a final capacitor product. This is especially true when the solvent is an organic one and the working or storage temperature is higher than 65° C. Instability of the binder can lead to a premature failure of an electrode and, thus a capacitor.

Typical extrusion processes use the fibrillation properties of certain polymers to provide a matrix for embedded conductive material. Some of the polymers in the family of flouropolymers, such as polytetrafluoroethylene (PTFE), are particularly inert and stable in the common electrolyte solvents used in double-layer capacitors, even those using organic solvent at high working or storage temperatures. Thus, the stability of an electrode made using PTFE can be higher than those made with other binders. Polymers and similar ultra-high molecular weight substances capable of fibrillization are also commonly referred to as "fibrillizable binders" or "fibril-forming binders." Fibril-forming binders find use with powder like materials. In one prior art process, fibrillizable binder and powder materials are mixed with solvent, lubricant, or the like, and the resulting wet mixture is subjected to high-shear forces to sufficiently fibrillize the binder particles. Fibrillization of the binder particles produces fibrils that eventually form a matrix or lattice for supporting the resulting composition of matter. The resulting dough-like material is calendared many times to produce a conductive film of desired thickness and density. In the prior art, the high shear forces can be provided by subjecting the mixture to an extruder.

In the prior art, the resulting additive based extruded product is subsequently processed in a high-pressure compactor, dried to remove the additive, shaped into a needed form, and otherwise processed to obtain an end-product for the needed application. For purposes of handling, processing, and durability, desirable properties of the end product typically depend on the consistency and homogeneity of the composition of matter from which the product is made, with good consistency and homogeneity being important requirements. Such desirable properties depend on the degree of fibrillization of the polymer. Tensile strength commonly depends on both the degree of fibrillization of the fibrillizable binder, and the consistency of the fibril lattice formed by the binder within the material. When used as an electrode, internal resistance of an electrode film is also important.

Internal resistance may depend on bulk resistivity—volume resistivity on large scale—of the material from which an electrode film is fabricated. Bulk resistivity of the material is a function of the material's homogeneity; the better the dispersal of the conductive carbon particles or other conductive filler within the material, the lower the resistivity of the material. When electrode films are used in capacitors, such as double-layer capacitors, capacitance per unit volume is yet another important characteristic. In double layer capacitors, capacitance increases with the specific surface area of the electrode film used to make a capacitor electrode. Specific surface area is defined as the ratio of (1) the surface area of electrode film exposed to an electrolytic solution when the electrode material is immersed in the solution, and (2) the volume of the electrode film. An electrode film's specific surface area and capacitance per unit volume are believed to improve with improvement in consistency and homogeneity.

Because fluoropolymers do not dissolve in most solvents, they are not suited for use as a binder in conventional solvent based coating processes. Because extrusion processes require large manufacturing equipment investments, it is often financially prohibitive for electrode manufacturers to adopt manufacturing processes that take advantage of the benefits of using fluoropolymers as a binder. As such, it would be desirable to use fluoropolymers in the manufacture of coated electrodes.

SUMMARY

In accordance with embodiments of the present invention, fibrillizable polymers and methods of using in manufacture of energy storage devices are described. The present invention provides methods for making long lasting, durable, and inexpensive energy storage devices, for example, capacitors. Fibrillization of the polymers is provided without the use of any processing additives. The present invention provides distinct advantages when compared to that of the coating based methods of the prior art. A high throughput method for making more durable and more reliable coating based energy storage devices is provided.

In one embodiment, a method of making a slurry coated electrode comprises the steps of dry blending dry carbon particles and dry binder to form a mixture that comprises the carbon particles and the dry binder; liquefying the mixture with a solution to form a slurry; applying the slurry to a current collector; drying the slurry; and compacting the current collector and slurry. The step of blending may comprise a step of dry fibrillizing the mixture. The dry fibrillizing step may comprise milling the mixture. The dry fibrillizing step may comprise subjecting the mixture to high shear forces. The dry fibrillizing step may utilize a high-pressure gas. The high-pressure gas may comprise a pressure of more than 60 PSI. The gas may comprise a dew point of no more than −40 degrees F., water content 12 PPM. The method may comprise a step of treating the current collector prior to applying the slurry to improve adhesion between the current collector and slurry. The step of treating the current collector may comprise coating the current collector with a bonding agent prior to applying the slurry. The step of treating the current collector may comprise roughening a surface of the current collector prior to applying the slurry. The dry binder may comprise fluoropolymer particles. The fluoropolymer particles may comprise PTFE. The mixture may comprise conductive particles. The mixture may comprise activated carbon particles. The mixture may comprise approximately 50% to 99% activated carbon. The mixture may comprise approximately 0% to 25% conductive carbon. The mixture may comprise approximately 0.5% to 20% fluoropolymer particles. The mixture may comprise approximately 80% to 95% activated carbon, approximately 0% to 15% conductive carbon, and approximately 3% to 15% fluoropolymer. The solution may comprise deionized water. The current collector may comprise aluminum. The step of applying the suspension further may comprise coating the current collector with the slurry using a doctor blade, a slot die, or a direct or reverse gravure process.

In one embodiment, a blend of dry particles fibrillized for use in the manufacture of a coated electrode comprises a mixture of dry fibrillized dry carbon and dry binder particles. The binder particles may comprise a polymer, and wherein the carbon particles comprise activated and conductive carbon. The binder may comprise fluoropolymer particles. The binder may comprise PTFE. The binder may comprise particles subject to high shear forces. The high shear forces may be applied by gas at more than about 60 PSI. The binder may comprise milled polymer particles. The binder may comprise jet milled polymer particles. The binder may comprise hammer milled polymer particles. The electrode may be an energy storage device electrode. The energy storage device may be a capacitor.

In one embodiment, an electrode comprises a dry blend of dry binder and dry carbon particles subjected to high shear forces. The blend may comprise approximately 50% to 99% activated carbon. The blend may comprise approximately 0% to 25% conductive carbon. The blend may comprise approximately 0.5% to 20% fluoropolymer. The blend may comprise approximately 80% to 95% activated carbon, approximately 0% to 15% conductive carbon, and approximately 3% to 15% fluoropolymer. The electrode may be a capacitor electrode. The electrode may be a double-layer capacitor electrode. The electrode may be a battery electrode. The electrode may be a fuel-cell electrode. The electrode may comprise a current collector, wherein the binder and conductive particles are formed as a slurry coupled to the current collector.

In one embodiment, a capacitor product comprises a dry fibrillized blend of particles subjected to high shear forces, the particles including binder and carbon particles; and one or more current collector, wherein the blend of dry particles are coated onto the one or more current collector. The one or more current collector and the dry particles may be disposed a bonding layer. The one or more current collector may comprise aluminum. The product may comprise a housing, wherein the one or more current collector is shaped as a roll, wherein the roll is disposed within the housing. Within the housing may be disposed an electrolyte. The electrolyte may comprise acetonitrile. The capacitor may be rated to operate at a voltage of no more than about 3.0 volts. In one embodiment, an energy storage device comprises dry fibrillized electrode means for providing coated functionality in a coated energy storage device.

In one embodiment, a capacitor, the capacitor comprises a housing; a cover; a collector, the collector disposed in the housing, the collector comprising two ends, a first end coupled to the housing, a second end coupled to the cover; a dried electrode slurry, the dried electrode slurry disposed as a coating onto the collector, the dried electrode slurry comprising a dry fibrillized blend of dry carbon and dry polymer, the dry fibrillized blend of dry carbon and dry polymer formed as a dry mixture comprised of essentially or substantially no processing additive; and an electrolyte, the electrolyte disposed in the housing. The capacitor may comprise a capacitance of greater than 1 Farad.

Other embodiments, benefits, and advantages will become apparent upon a further reading of the following Figures, Description, and Claims.

BRIEF DESCRIPTION OF THE DRAWINGS

FIG. 1b is a high-level front view of a jet mill assembly used to fibrillize binder within a dry carbon particle mixture.

FIG. 1d is a top view of the jet mill assembly shown in FIGS. 1b and 1c.

FIG. 1e is a high-level front view of a compressor and a compressed air storage tank used to supply compressed air to a jet mill assembly.

FIG. 1g is a high-level front view of the jet mill assembly of FIGS. 1b-d in combination with a dust collector and a collection container.

FIGS. 1i, 1j, and 1k illustrate effects of variations in feed rate, grind pressure, and feed pressure on tensile strength in length, tensile strength in width, and dry resistivity of electrode materials.

DESCRIPTION OF THE PREFERRED EMBODIMENTS

Reference will now be made in detail to several embodiments of the invention that are illustrated in the accompanying drawings. In accordance with embodiments of the present invention, fibrillizable polymers and methods of using in manufacture of energy storage devices are described. The present invention provides methods for making long lasting, durable, and inexpensive energy storage devices, for example, capacitors. Fibrillization of the polymers is provided without the use of any processing additives. The present invention provides distinct advantages when compared to that of the coating based methods of the prior art. A high throughput method for making more durable and more reliable coating based energy storage devices is provided.

In the embodiments that follow, it will be understood that reference to no-use and non-use of additive(s) in the manufacture of an energy storage device according to the present invention takes into account that electrolyte may be used during a final electrode electrolyte immersion/impregnation step. An electrode electrolyte immersion/impregnation step is typically utilized prior to providing a final finished capacitor electrode in a sealed housing. Furthermore, even though additives, such as solvents, liquids, and the like, are not used in the dry fibrillization of polymers and dry particles in embodiments disclosed herein, during fibrillization, a certain amount of impurity, for example, moisture, may be absorbed or attach itself from a surrounding environment. Those skilled in the art will understand that the dry particles used with embodiments and processes disclosed herein may also, prior to their being provided by particle manufacturers as dry particles, have themselves been pre-processed with additives, liquids, solvents, etc., and, thus, comprise one or more pre-process residue thereof. It is identified that even after one or more drying step, trace amounts of the aforementioned pre-process residues and impurities may be present in the dry fibrillization process steps described herein.

Figure 1A:
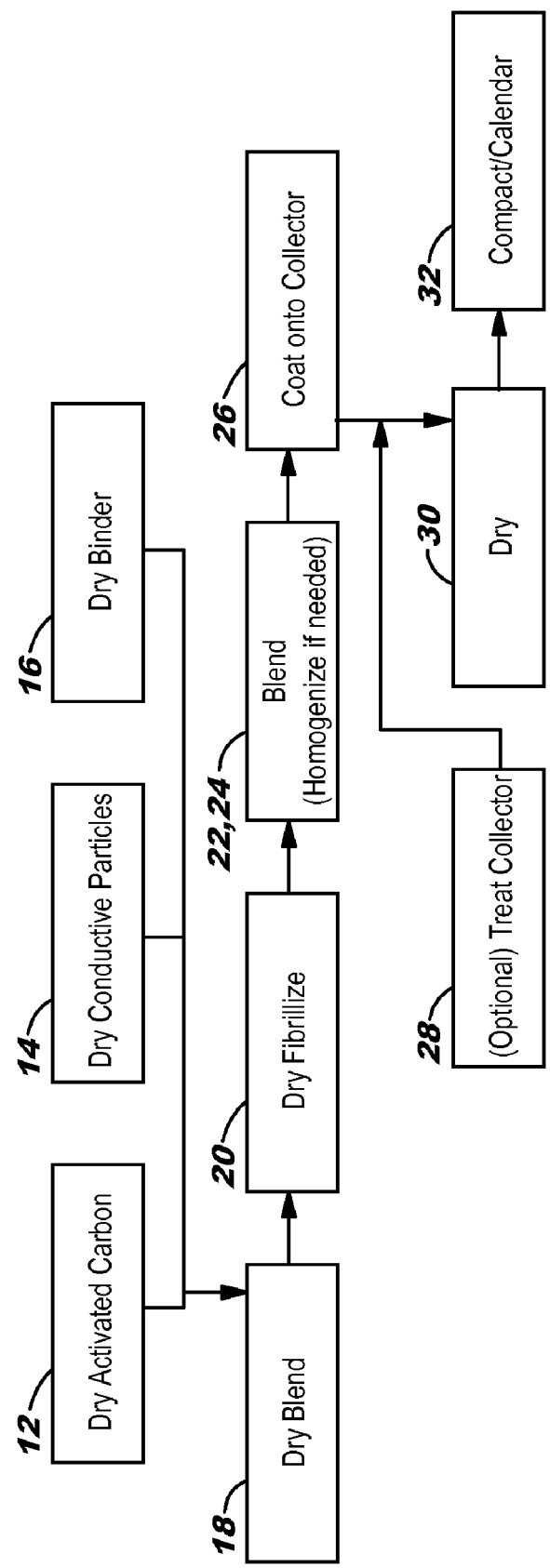
FIG. 1a is a block diagram illustrating a method for making an energy storage device electrode.

Referring now to FIG. 1*a*, a block diagram illustrating a process for making an energy device using dry fibrillized binder is shown. The process shown in FIG. 1*a* begins by dry blending dry carbon particles and dry binder particles together. Those skilled in the art will understand that depending on particle size, particles can be described as powders and the like, and that reference to particles is not meant to be limiting to the embodiments described herein, which should be limited only by the appended claims and their equivalents. For example, within the scope of the term "particles," the present invention contemplates powders, spheres, platelets, flakes, fibers, nano-tubes, and other particles with other dimensions and other aspect ratios. In one embodiment, dry carbon particles as referenced herein refers to activated carbon particles 12 and/or conductive particles 14, and binder particles 16 as referenced herein refers to an inert dry binder. In one embodiment, conductive particles 14 comprise conductive carbon particles. In one embodiment, conductive particles 14, may comprise graphite. In one embodiment, it is envisioned that conductive particles 14 may comprise a metal powder or the like. In one embodiment, dry binder 16 comprises a fibrillizable polymer, for example, polytetrafluoroethylene (PTFE) particles. Other fibrillizable binders envisioned for use herein include ultra-high molecular weight polypropylene, polyethylene, co-polymers, polymer blends and the like. It is understood that the present invention should not be limited by the disclosed or suggested binder, but rather, by the claims that follow. In one embodiment, particular mixtures of particles 12, 14, and binder 16 comprise about 50% to 99% activated carbon, about 0% to 25% conductive carbon, and/or about 0.5% to 50% binder by weight. In a more particular embodiment, particle mixtures include about 80% to 90% activated carbon, about 0% to 15% conductive carbon, and about 3% to 15% binder by weight. In one embodiment, the activated carbon particles 12 comprise a mean diameter of about 10 microns. In one embodiment, the conductive carbon particles 14 comprise a range of diameters of less than 20 microns. In one embodiment, the binder particles 16 comprise a mean diameter of about 450 microns. Suitable carbon powders are available from a variety of sources, including YP-17 activated carbon particles sold by Kuraray Chemical Co., LTD, Shin-hankyu Bldg. 9F Blvd. C-237, 1-12-39 Umeda, Kiata-ku, Osaka 530-8611, Japan; and BP 2000 conductive particles sold by Cabot Corp. 157 Concord Road, P.O. Box 7001, Billerica, Mass. 01821-7001, Phone: 978 663-3455.

In step 18, particles of activated carbon, conductive carbon, and binder provided during respective steps 12, 14, and 16 are dry blended together to form a dry mixture. In one embodiment, dry particles 12, 14, and 16 are blended for 1 to 10 minutes in a V-blender equipped with a high intensity mixing bar until a uniform dry mixture is formed. Those skilled in the art will identify that blending time can vary based on batch size, materials, particle size, densities, as well as other properties, and yet remain within the scope of the present invention. With reference to blending step 18, in one embodiment, particle size reduction and classification can be carried out as part of the blending step 18, or prior to the blending step 18. Size reduction and classification may improve consistency and repeatability of the resulting blended mixture and, consequently, of the quality of electrode films and electrodes fabricated therefrom.

Figure 1C:
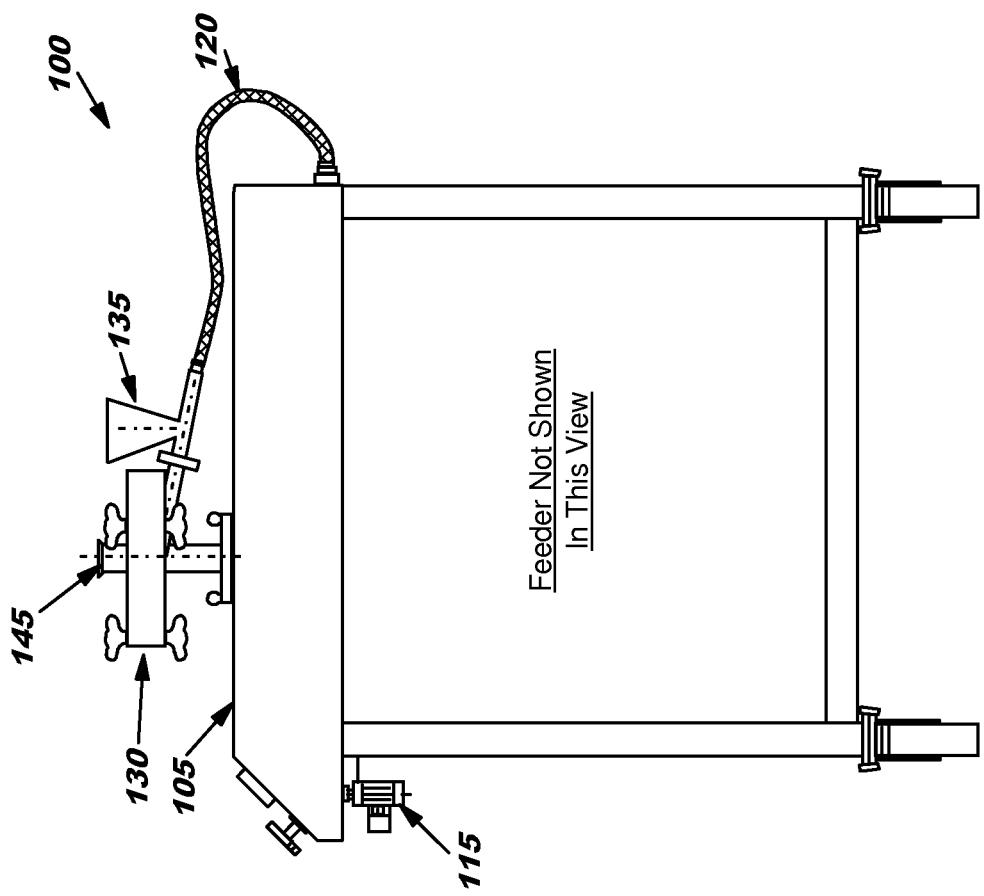
FIG. 1c is a high-level side view of a jet mill assembly shown in FIG. 1b.

After dry blending step 18, dry binder 16 within the dry particles is fibrillized in a dry fibrillizing step 20. The dry fibrillizing step 20 is effectuated using a dry solventless and liquidless high shear technique. During dry fibrillizing step 20, high shear forces are applied to dry binder 16 in order to physically stretch it. The stretched binder forms a network of thin web-like fibers that act to enmesh, entrap, bind, and/or support the dry particles 12 and 14. In one embodiment, fibrillizing step 20 may be effectuated using a jet mill. Referring to now to FIGS. 1*b*, 1*c*, and 1*d*, there is seen, respectively, front, side, and top views of a jet mill assembly 100 used to perform a dry fibrillization step 20. For convenience, the jet mill assembly 100 is installed on a movable auxiliary equipment table 105, and includes indicators 110 for displaying various temperatures and gas pressures that arise during operation. A gas input connector 115 receives compressed air from an external supply and routes the compressed air through internal tubing (not shown) to a feed air hose 120 and a grind air hose 125, which both lead and are connected to a jet mill 130. The jet mill 130 includes: (1) a funnel-like material receptacle device 135 that receives compressed feed air from the feed air hose 120, and the blended carbon-binder mixture of step 18 from a feeder 140; (2) an internal grinding chamber where the carbon-binder mixture material is processed; and (3) an output connection 145 for removing the processed material. In the illustrated embodiment, the jet mill 130 is a 4-inch Micronizer® model available from Sturtevant, Inc., 348 Circuit Street, Hanover, Mass. 02339; telephone number (781) 829-6501. The feeder 140 is an AccuRate® feeder with a digital dial indicator model 302M, available from Schenck AccuRate®, 746 E. Milwaukee Street, P.O. Box 208, Whitewater, Wis. 53190; telephone number (888) 742-1249. The feeder includes the following components: a 0.33 cubic ft. internal hopper; an external paddle agitation flow aid; a 1.0-inch, full pitch, open flight feed screw; a ⅛ hp, 90 VDC, 1,800 rpm, TENV electric motor drive; an internal mount controller with a variable speed, 50:1 turndown ratio; and a 110 Volt, single-phase, 60 Hz power supply with a power cord. The feeder 140 dispenses the carbon-binder mixture provided by step 18 at a preset rate. The rate is set using the digital dial, which is capable of settings between 0 and 999, linearly controlling the feeder operation. The highest setting of the feeder dial corresponds to a jet mill output of about 12 kg per hour.

Figure 1F:
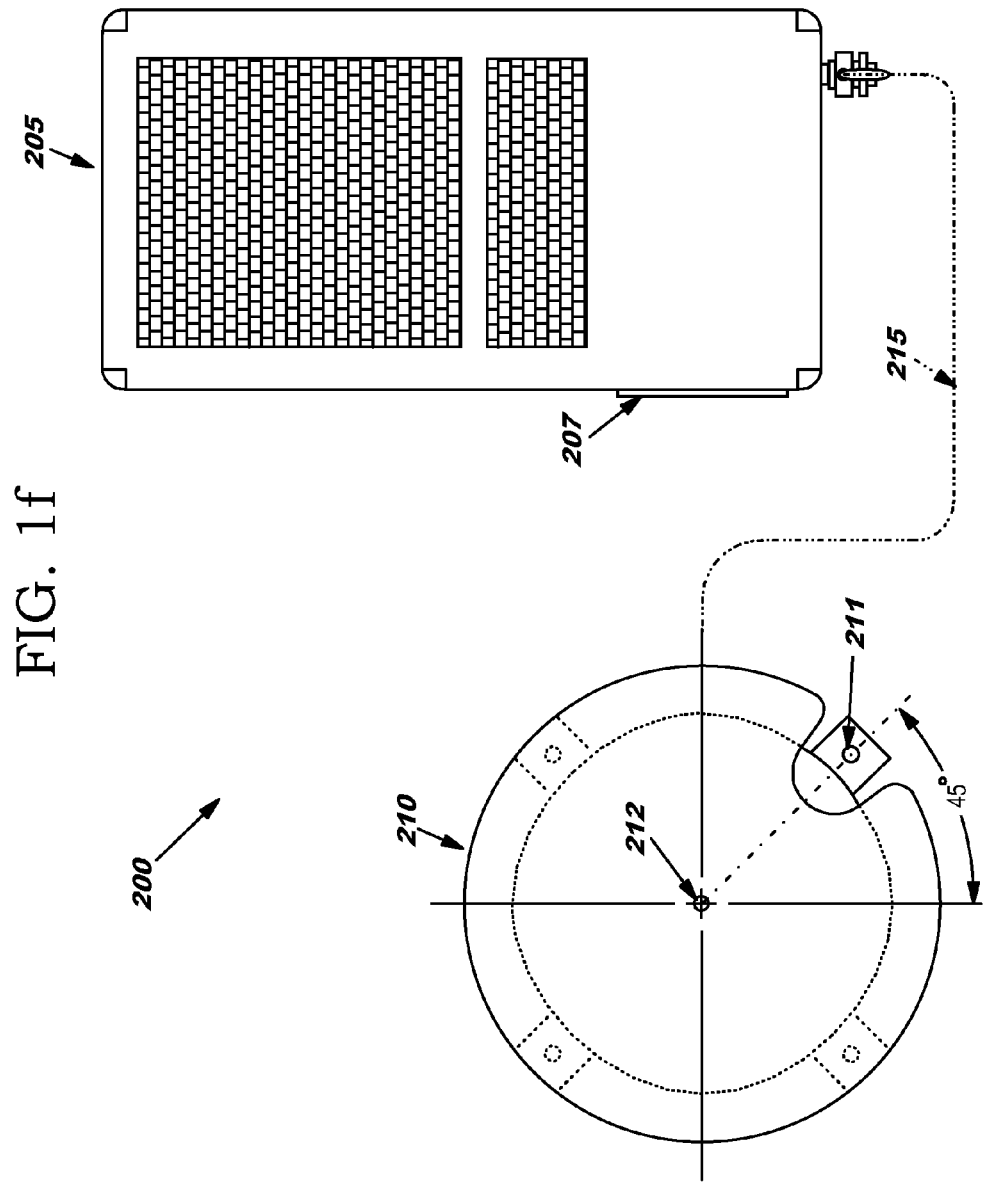
FIG. 1f is a high-level top view of the compressor and the compressed air storage tank shown in FIG. 1e, in accordance with the present invention.

The feeder 140 appears in FIGS. 1b and 1d, but has been omitted from FIG. 1c, to prevent obstruction of view of other components of the jet mill 130. The compressed air used in the jet mill assembly 100 is provided by a combination 200 of a compressor 205 and a compressed air storage tank 210, illustrated in FIGS. 1e and 1f; FIG. 1e is a front view and FIG. 1f is a top view of the combination 200. The compressor 205 used in this embodiment is a GA 30-55C model available from Atlas Copco Compressors, Inc., 161 Lower Westfield Road, Holyoke, Mass. 01040; telephone number (413) 536-0600. The compressor 205 includes the following features and components: air supply capacity of 180 standard cubic feet per minute ("SCFM") at 125 PSIG; a 40-hp, 3-phase, 60 HZ, 460 VAC premium efficiency motor; a WYE-delta reduced voltage starter; rubber isolation pads; a refrigerated air dryer; air filters and a condensate separator; an air cooler with an outlet 206; and an air control and monitoring panel 207. The 180-SCFM capacity of the compressor 205 is more than sufficient to supply the 4-inch Micronizer® jet mill 130, which is rated at 55 SCFM. The compressed air storage tank 210 is a 400-gallon receiver tank with a safety valve, an automatic drain valve, and a pressure gauge. The compressor 205 provides compressed air to the tank 205 through a compressed air outlet valve 206, a hose 215, and a tank inlet valve 211.

It is identified that the compressed air provided under high-pressure by compressor 205 is preferably as dry as possible. In one embodiment, a range of acceptable dew point for the air is about −20 to −40 degrees F., and water content of less than about 20 ppm. Although discussed as being effectuated by high-pressure air, it is understood that other sufficiently dry gases are envisioned as being used to fibrillize binder particles utilized in embodiments of the present invention, for example, oxygen, nitrogen, helium, and the like. In one embodiment, the gas may comprise a dew point between about −20 and −40 degrees F., and a water content of less than about 20 PPM.

In the jet mill 130, the carbon-binder mixture is inspired by venturi and transferred by the compressed feed air into a grinding chamber, where the fibrillization of the mixture takes place. The grinding chamber, which has a generally cylindrical shape, includes one or more nozzles placed circumferentially. The nozzles discharge the compressed grind air that is supplied by the grind air hose 125. The compressed air jets injected by the nozzles accelerate the carbon-binder particles and cause predominantly particle-to-particle collisions, although some particle-wall collisions also take place. The collisions dissipate the energy of the compressed air relatively quickly, fibrillizing the dry binder 16 within the mixture and embedding carbon particle 12 and 14 aggregates and agglomerates into the lattice formed by the fibrillized binder. The collisions may also cause size reduction of the carbon aggregates and agglomerates. The colliding particles 12, 14, and 16 spiral towards the center of the grinding chamber and exit the chamber through the output connection 145.

Figure 1H:
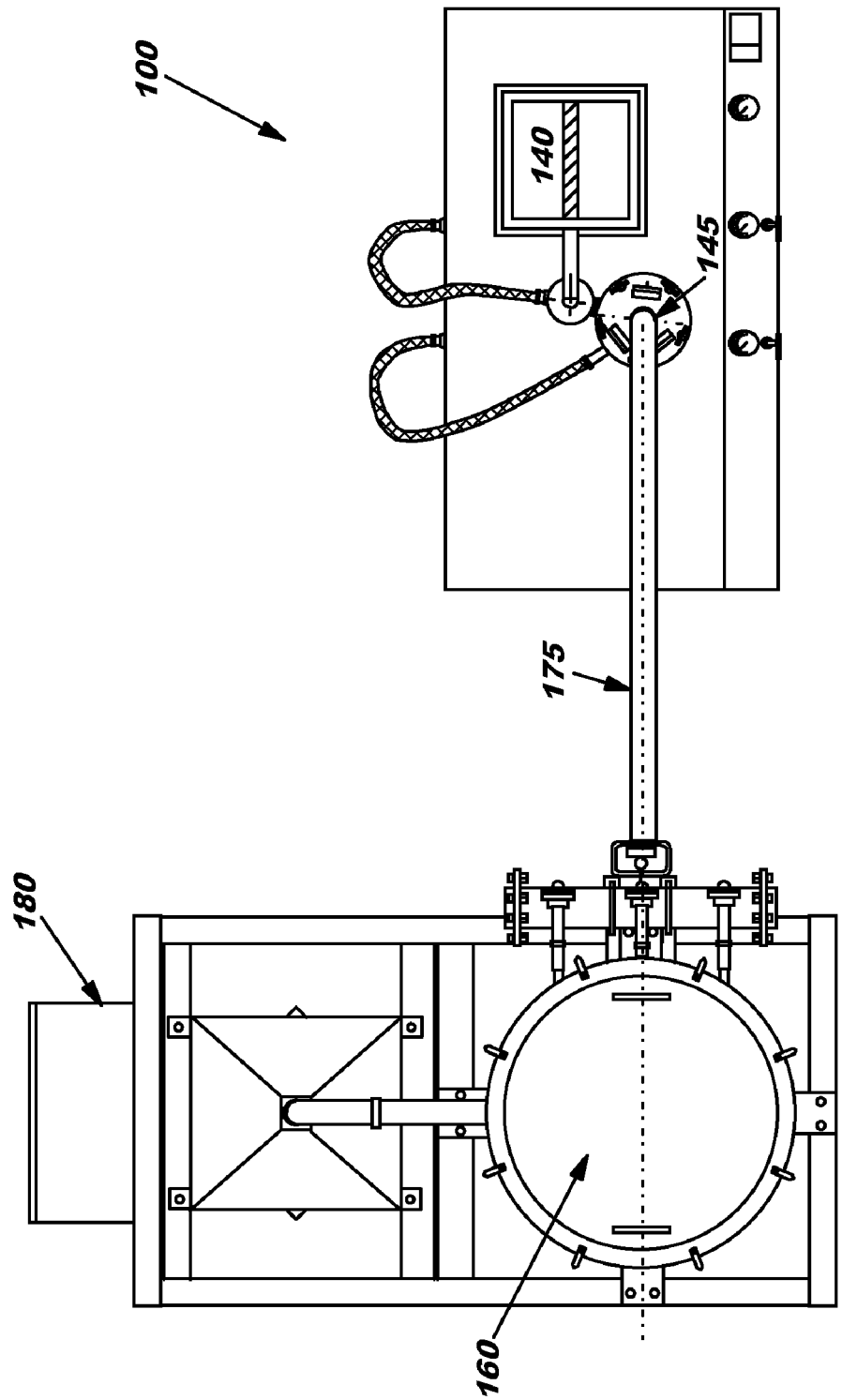
FIG. 1h is a high-level top view of the combination of FIGS. 1f and 1g.

Referring now to FIGS. 1g and 1h, there are seen front and top views, respectively, of the jet mill assembly 100, a dust collector 160, and a collection container 170. In one embodiment, the fibrillized carbon-binder particles that exit through the output connection 145 are guided by a discharge hose 175 from the jet mill 130 into a dust collector 160. In the illustrated embodiment, the dust collector 160 is model CL-7-36-11 available from Ultra Industries, Inc., 1908 DeKoven Avenue, Racine, Wis. 53403; telephone number (262) 633-5070. Within the dust collector 160 the output of the jet mill 130 is separated into (1) air and dust, and (2) a dry fibrillized carbon-binder particle mixture 20. The carbon-binder mixture is collected in the container 170, while the air is filtered by one or more filters to remove the dust, and then discharged. The filters, which may be internal or external to the dust collector 160, are periodically cleaned, and the dust is discarded. Operation of the dust collector is directed from a control panel 180.

It has been identified that a dry compounded material, which is provided by dry fibrillization step 20, retains its homogeneous particle like properties for a limited period of time. In one embodiment, because of forces, for example, gravitational forces exerted on the dry particles 12, 14, and 16, the compounded material begins to settle such that spaces and voids that exist between the dry particles 12, 14, 16 after step 20 gradually become reduced in volume. In one embodiment, after a relatively short period of time, for example 10 minutes or so, the dry particles 12, 14, 16 compact together and begin to form clumps or chunks such that the homogeneous properties of the compounded material may be diminished and/or such that downstream processes that require free flowing compounded materials are made more difficult to achieve.

Accordingly, in one embodiment, it is identified that a dry compounded material as provided by step 20 should be utilized before its homogeneous properties are no longer sufficiently present and/or that steps are taken to keep the compounded material sufficiently aerated to avoid clumping. It should be noted that the specific processing components described so far may vary as long as the intent of the embodiments described herein is achieved. For example, techniques and machinery that are envisioned for potential use to provide high shear forces to effectuate a dry fibrillization step 20 include jet milling, pin milling, impact pulverization, and hammer milling, and other techniques and apparatus that can provide sufficiently high shear forces to a dry material. Further in example, a wide selection of dust collectors can be used in alternative embodiments, ranging from simple free-hanging socks to complicated housing designs with cartridge filters or pulse-cleaned bags. Similarly, other feeders can be easily substituted in the assembly 100, including conventional volumetric feeders, loss-weight volumetric feeders, and vibratory feeders. The size, make, and other parameters of the jet mill 130 and the compressed air supply apparatus (the compressor 205 and the compressed air storage tank 210) may also vary and yet be within the scope of the present invention.

The present inventors have performed a number of experiments to investigate the effects of three factors in the operation of jet mill assembly 100 on qualities of the dry compounded material provided by dry fibrillization step 20, and on compacted electrode films fabricated therefrom. The three factors are these: (1) feed air pressure, (2) grind air pressure, and (3) feed rate. The observed qualities included tensile strength in width (i.e., in the direction transverse to the direction of movement of a electrode film in a high-pressure calender during a compacting process); tensile strength in length (i.e., in the direction of the film movement); resistivity of the dry jet mill processed mixture provided by dry fibrillization step 20; internal resistance of compacted electrode films; and specific capacitance achieved in a double layer capacitor application. Resistance and specific capacitance values were obtained for both charge (up) and discharge (down) capacitor cycles.

The design of experiments ("DOE") included a three-factorial, eight experiment investigation performed with electrode films dried for 3 hours under vacuum conditions at 160 degrees Celsius. Five or six samples were produced in each of the experiments, and values measured on the samples of each experiment were averaged to obtain a more reliable result. The three-factorial experiments were performed at a dew point of about −40 degrees F., water content 12 ppm and included the following points for the three factors:

1. Feed rate was set to indications of 250 and 800 units on the feeder dial used. Recall that the feeder rate has a linear dependence on the dial settings, and that a full-scale setting of 999 corresponds to a rate of production of about 12 kg per hour (and therefore a substantially similar material consumption rate). Thus, settings of 250 units corresponded to a feed rate of about 3 kg per hour, while settings of 800 units corresponded to a feed rate of about 9.6 kg per hour. In accordance with the standard vernacular used in the theory of design of experiments, in the accompanying tables and graphs the former setting is designated as a "0" point, and the latter setting is designated as a "1" point.

2. The grind air pressure was set alternatively to 85 psi and 110 psi, corresponding, respectively, to "0" and "1" points in the accompanying tables and graphs.

3. The feed air pressure (also known as inject air pressure) was set to 60 and 70 psi, corresponding, respectively, to "0" and "1" points.

Turning first to tensile strength measurements, strips of standard width were prepared from each sample, and the tensile strength measurement of each sample was normalized to a one-mil thickness. The results for tensile strength measurements in length and in width appear in Tables 2 and 3 below.

TABLE 2

Tensile Strength in Length

| Exp. No. | FACTORS Feed Rate, Grind psi, Feed psi | DOE POINTS | SAMPLE THICKNESS (mil) | TENSILE STRENGTH IN LENGTH (grams) | NORMALIZED TENSILE STRENGTH IN LENGTH (g/mil) |
|---|---|---|---|---|---|
| 1 | 250/85/60 | 0/0/0 | 6.1 | 123.00 | 20.164 |
| 2 | 250/85/70 | 0/0/1 | 5.5 | 146.00 | 26.545 |
| 3 | 250/110/60 | 0/1/0 | 6.2 | 166.00 | 26.774 |
| 4 | 250/110/70 | 0/1/1 | 6.1 | 108.00 | 17.705 |
| 5 | 800/85/60 | 1/0/0 | 6.0 | 132.00 | 22.000 |
| 6 | 800/85/70 | 1/0/1 | 5.8 | 145.00 | 25.000 |
| 7 | 800/110/60 | 1/1/0 | 6.0 | 135.00 | 22.500 |
| 8 | 800/110/70 | 1/1/1 | 6.2 | 141.00 | 22.742 |

TABLE 3

Tensile Strength in Width

| Exp. No. | Factors (Feed Rate, Grind psi, Feed psi) | DOE Points | Sample Thickness (mil) | Tensile Strength in Length (grams) | Normalized Tensile Strength in Length (g/mil) |
|---|---|---|---|---|---|
| 1 | 250/85/60 | 0/0/0 | 6.1 | 63.00 | 10.328 |
| 2 | 250/85/70 | 0/0/1 | 5.5 | 66.00 | 12.000 |
| 3 | 250/110/60 | 0/1/0 | 6.2 | 77.00 | 12.419 |
| 4 | 250/110/70 | 0/1/1 | 6.1 | 59.00 | 9.672 |
| 5 | 800/85/60 | 1/0/0 | 6.0 | 58.00 | 9.667 |
| 6 | 800/85/70 | 1/0/1 | 5.8 | 70.00 | 12.069 |
| 7 | 800/110/60 | 1/1/0 | 6.0 | 61.00 | 10.167 |
| 8 | 800/110/70 | 1/1/1 | 6.2 | 63.00 | 10.161 |

Table 4 below presents resistivity measurements of a jet milled dry blend of particles provided by dry fibrillization step 20. Note that the resistivity measurements were taken before the mixture was processed into an electrode film.

TABLE 4

Dry Resistance

| Exp. No. | Factors (Feed Rate, Grind psi, Feed psi) | DOE Points | DRY RESISTANCE (Ohms) |
|---|---|---|---|
| 1 | 250/85/60 | 0/0/0 | 0.267 |
| 2 | 250/85/70 | 0/0/1 | 0.229 |
| 3 | 250/110/60 | 0/1/0 | 0.221 |
| 4 | 250/110/70 | 0/1/1 | 0.212 |
| 5 | 800/85/60 | 1/0/0 | 0.233 |
| 6 | 800/85/70 | 1/0/1 | 0.208 |
| 7 | 800/110/60 | 1/1/0 | 0.241 |
| 8 | 800/110/70 | 1/1/1 | 0.256 |

Figure 1I:
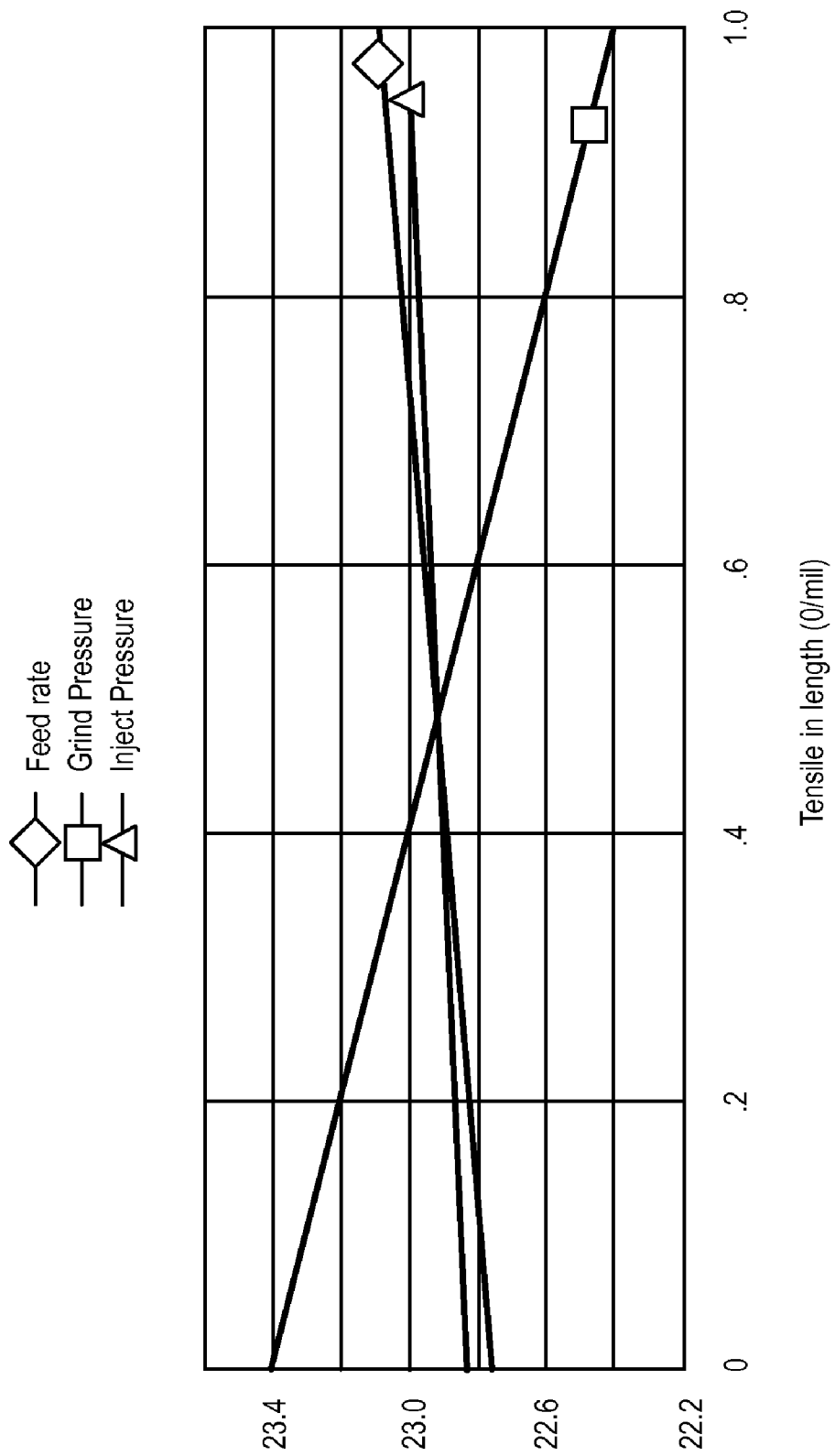
Figure 1J:
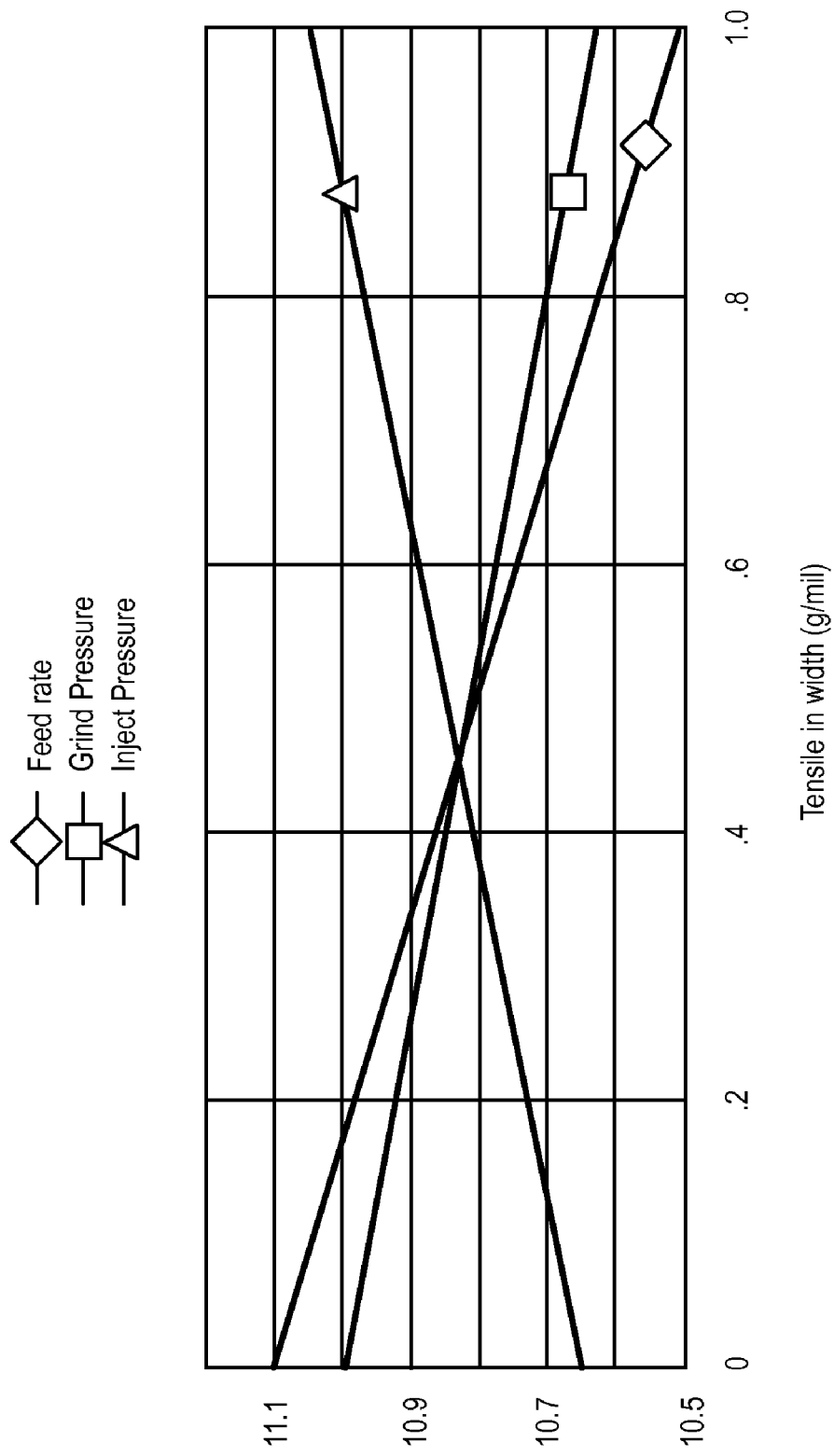

Referring now to FIGS. 1i, 1j, and 1k, there are illustrated the effects of the three factors on the tensile strength in length, tensile strength in width, and dry resistivity. Note that each end-point for a particular factor line (i.e., the feed rate line, grind pressure line, or inject pressure line) on a graph corresponds to a measured value of the quality parameter (i.e., tensile strength or resistivity) averaged over all experiments with the particular key factor held at either "0" or "1," as the case may be. Thus, the "0" end-point of the feed rate line (the left most point) represents the tensile strength averaged over experiments numbered 1-4, while the "1" end-point on the same line represents the tensile strength averaged over experiments numbered 4-8. As can be seen from FIGS. 1i and 1j, increasing the inject pressure has a moderate to large positive effect on the tensile strength of an electrode film. At the same time, increasing the inject pressure has the largest effect on the dry resistance of the powder mixture, swamping the effects of the feed rate and grind pressure. The dry resistance decreases with increasing the inject pressure. Thus, all three qualities benefit from increasing the inject pressure.

In Table 5 below we present data for final capacitances measured in double-layer capacitors utilizing electrode films made from dry fibrillized particles as described herein by each of the 8 experiments, averaged over the sample size of each experiment. Note that $C_{up}$ refers to the capacitances measured when charging double-layer capacitors, while $C_{down}$ values were measured when discharging the capacitors. As in the case of tensile strength data, the capacitances were normalized to the thickness of the electrode film. In this case, however, the thicknesses have changed, because the film has undergone compression in a high-pressure nip during a process of bonding the film to a current collector. It is noted in obtaining the particular results of Table 5, the electrode film was bonded to a current collector by an intermediate layer of coated adhesive. Normalization was carried out to the standard thickness of 0.150 millimeters.

ing $R_{down}$ and normalized $C_{up}$. Note that in FIG. 1m the Feed Rate and the Grind Pressure lines are substantially coincident. Once again, increasing the inject pressure benefits both electrode resistance $R_{down}$ (lowering it), and the normalized capacitance $C_{up}$ (increasing it). Moreover, the effect of the inject pressure is greater than the effects of the other two factors. In fact, the effect of the inject pressure on the normalized capacitance overwhelms the effects of the feed rate and the grind pressure factors, at least for the factor ranges investigated.

Additional data has been obtained relating $C_{up}$ and $R_{down}$ to further increases in the inject pressure. Here, the feed rate and the grind pressure were kept constant at 250 units and 110 psi, respectively, while the inject pressure during production was set to 70 psi, 85 psi, and 100 psi. Bar graphs in FIG. 1p illustrate these data. As can be seen from these graphs, the normalized capacitance $C_{up}$ was little changed with increasing inject pressure beyond a certain point, while electrode resistance displayed a drop of several percentage points when the inject pressure was increased from 85 psi to 100 psi. The inventors herein believe that increasing the inject pressure beyond 100 psi would further improve electrode performance, particularly by decreasing internal electrode resistance.

TABLE 5

$C_{up}$ and $C_{down}$

| Exp. No. | Factors (Feed Rate, Grind psi, Feed psi) | DOE Points | Sample Thickness (mm) | $C_{up}$ (Farads) | Normalized $C_{up}$ (Farads) | $C_{down}$ (Farads) | NORMALIZED $C_{down}$ (Farads) |
|---|---|---|---|---|---|---|---|
| 1 | 250/85/60 | 0/0/0 | 0.149 | 1.09 | 1.097 | 1.08 | 1.087 |
| 2 | 250/85/70 | 0/0/1 | 0.133 | 0.98 | 1.105 | 0.97 | 1.094 |
| 3 | 250/110/60 | 0/1/0 | 0.153 | 1.12 | 1.098 | 1.11 | 1.088 |
| 4 | 250/110/70 | 0/1/1 | 0.147 | 1.08 | 1.102 | 1.07 | 1.092 |
| 5 | 800/85/60 | 1/0/0 | 0.148 | 1.07 | 1.084 | 1.06 | 1.074 |
| 6 | 800/85/70 | 1/0/1 | 0.135 | 1.00 | 1.111 | 0.99 | 1.100 |
| 7 | 800/110/60 | 1/1/0 | 0.150 | 1.08 | 1.080 | 1.07 | 1.070 |
| 8 | 800/110/70 | 1/1/1 | 0.153 | 1.14 | 1.118 | 1.14 | 1.118 |

In Table 6 we present data for resistances measured in each of the 8 experiments, averaged over the sample size of each experiment. Similarly to the previous table, $R_{up}$ designates resistance values measured when charging double-layer capacitors, while $R_{down}$ refers to resistance values measured when discharging the capacitors.

TABLE 6

$R_{up}$ and $R_{down}$

| Exp. No. | Factors (Feed Rate, Grind psi, Feed psi) | DOE Points | Sample Thickness (mm) | Electrode Resistance $R_{up}$ (Ohms) | Electrode Resistance $R_{down}$ (Ohms) |
|---|---|---|---|---|---|
| 1 | 250/85/60 | 0/0/0 | 0.149 | 1.73 | 1.16 |
| 2 | 250/85/70 | 0/0/1 | 0.133 | 1.67 | 1.04 |
| 3 | 250/110/60 | 0/1/0 | 0.153 | 1.63 | 1.07 |
| 4 | 250/110/70 | 0/1/1 | 0.147 | 1.64 | 1.07 |
| 5 | 800/85/60 | 1/0/0 | 0.148 | 1.68 | 1.11 |
| 6 | 800/85/70 | 1/0/1 | 0.135 | 1.60 | 1.03 |
| 7 | 800/110/60 | 1/1/0 | 0.150 | 1.80 | 1.25 |
| 8 | 800/110/70 | 1/1/1 | 0.153 | 1.54 | 1.05 |

Figure 1M:
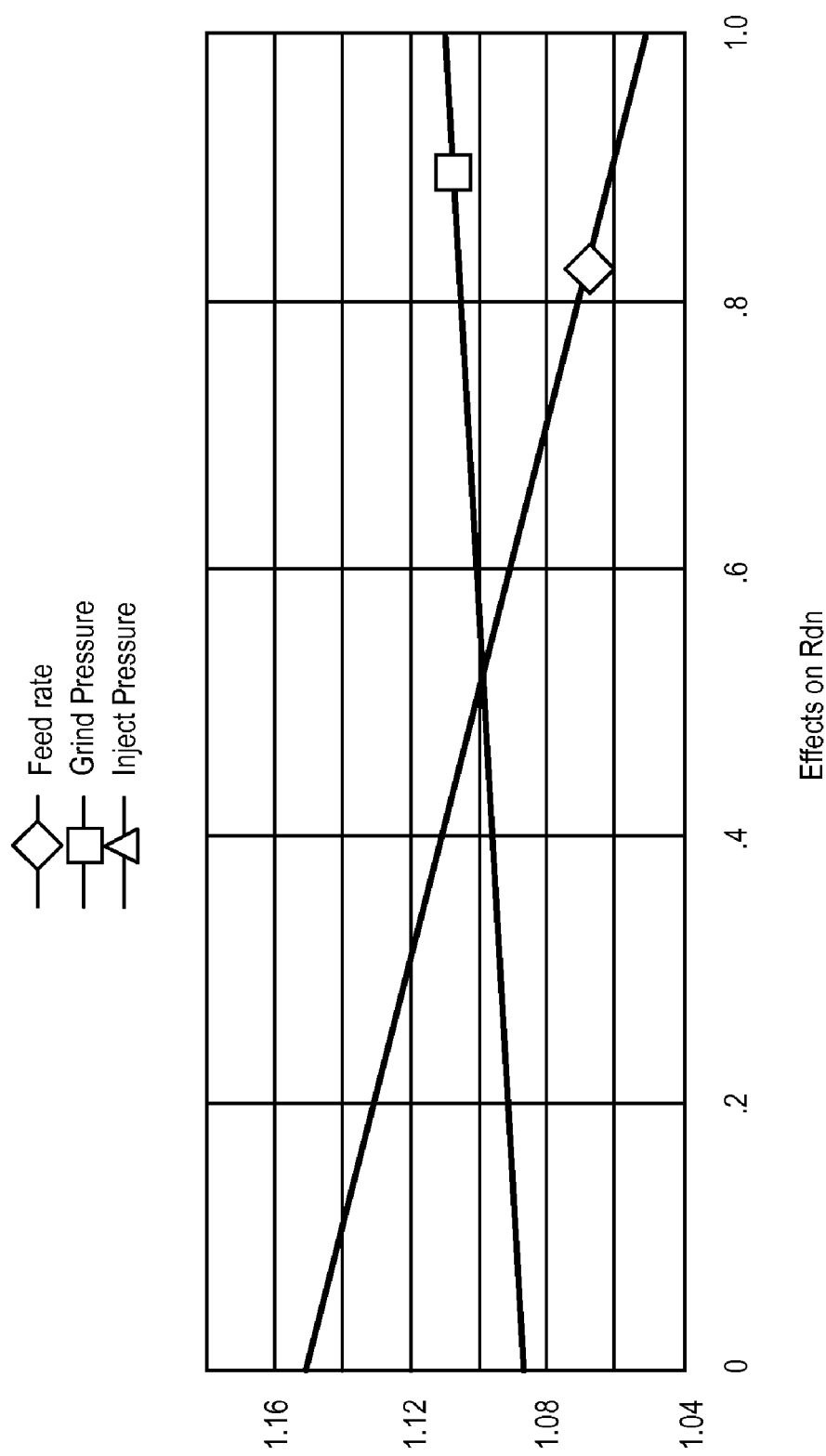
FIG. 1*m* illustrates effects of variations in feed rate, grind pressure, and feed pressure.
Figure 1N:
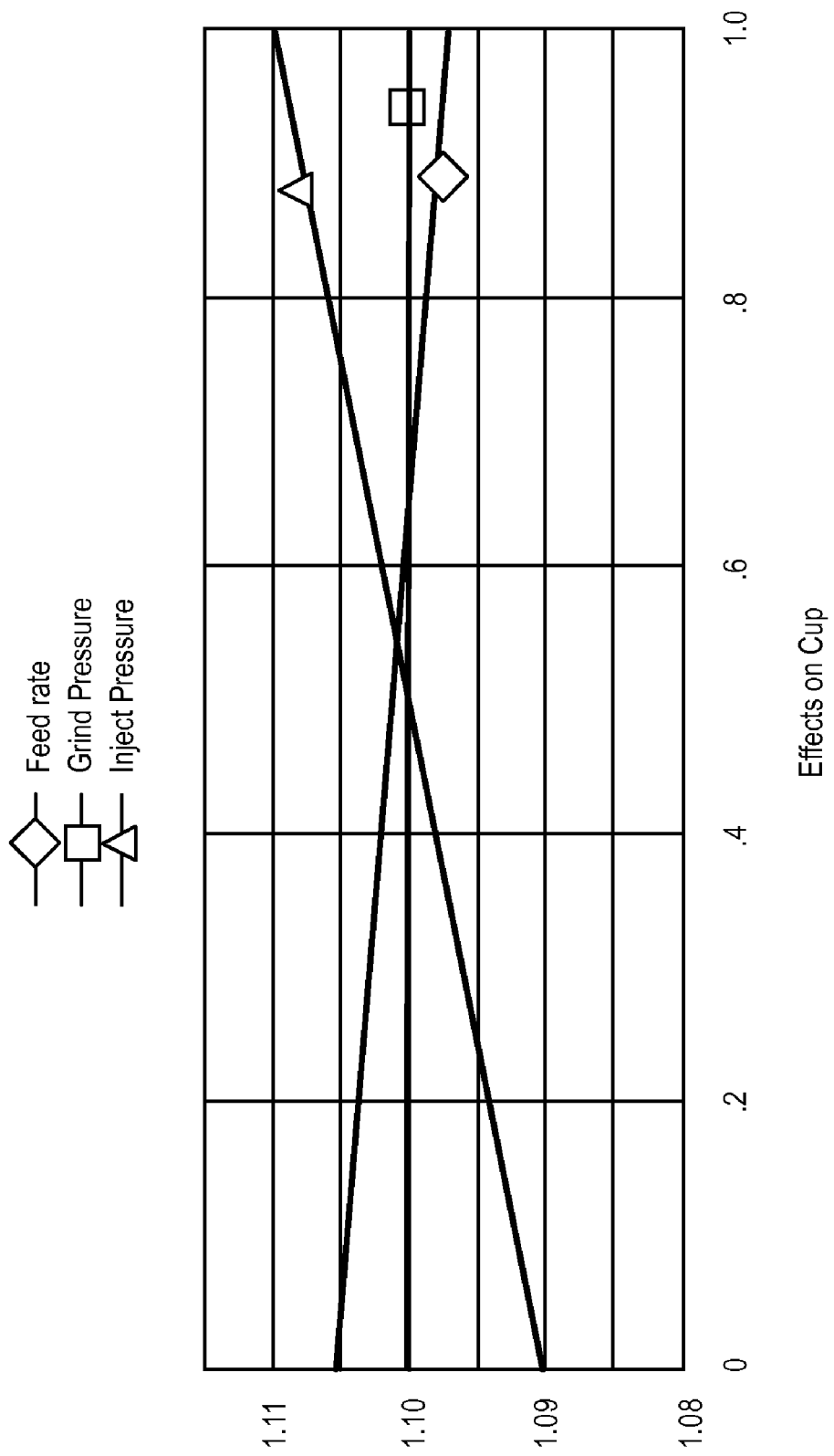
FIG. 1*n* illustrates effects of variations in feed rate, grind pressure, and feed pressure on capacitance.
Figure 1P:
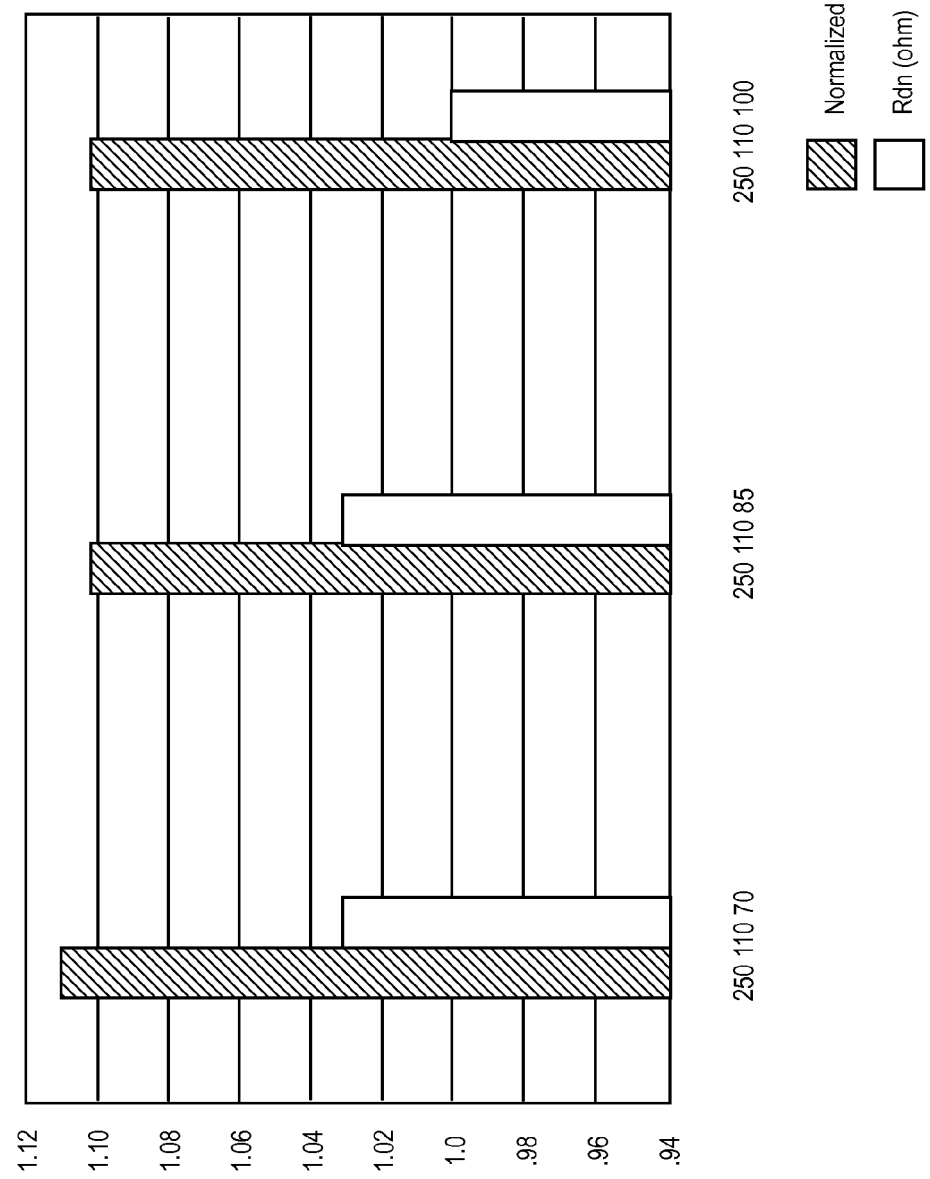
FIG. 1*p* illustrates effect of variation in feed pressure on internal resistance of electrodes, and on the capacitance of double layer capacitors using such electrodes.

To help visualize the above data and identify the data trends, we present FIGS. 1m and 1n, which graphically illustrate the relative importance of the three factors on the result- Although dry blending 18 and dry fibrillization step 20 have been discussed herein with reference to specific apparatus, it is envisioned that steps 18 and 20 could be conducted in one step wherein an apparatus receives dry particles 12, 14, and/or 16 as separate streams to mix the particles and thereafter fibrillize the particles. Accordingly, it is understood that the embodiments herein should not be limited by steps 18 and 20, but by the claims that follow. Furthermore, the preceding paragraphs describe in considerable detail inventive methods for dry fibrillizing dry carbon and dry binder mixtures, however, neither the specific embodiments of the invention as a whole, nor those of its individual features should limit the general principles described herein, which should be limited only by the claims that follow.

In contrast to the additive-based prior art fibrillization steps, the present invention provides sufficiently high shear forces without using processing additives, aides, liquids, solvents, or the like. Furthermore, with the present invention no additives are used before, during, or after application of the shear forces. Numerous benefits derive from non-use of prior art additives including: reduction of process steps and processing apparatus, increase in throughput, the elimination or substantial reduction of residue and impurities that can derive from the use of additives and additive-based process steps, a substantial reduction or elimination in undesired reactions that can occur with such residues and impurities, as well as other benefits that are discussed or that can be understood by those skilled in the art from the disclosure provided herein.

The present invention permits that such polymers can be used in the coating slurry based process described below. In blending step 22 of FIG. 1a, an aqueous solution may be added to the compounded dry fibrillized material that was created during dry fibrillization step 20. In one embodiment, the aqueous solution is used to make a slurry, which can be used for application of the dry particles 12, 14, and 16 during an electrode coating process. In one embodiment, the compounded material provided by dry fibrillization step 20 is added to 2 to 6 times its weight of deionized water.

In some cases, after adding an aqueous solution in step 22, clumps or chunks of compounded material may remain in the resulting suspension. In step 24, if needed, the compounded material can be further mixed to homogenize the compounded material so as to form a smooth slurry. Alternative aqueous solutions (such as a mixture of water and organic solvents) and means and methods of homogenizing the compounded particles can also be used to form the slurry described herein. In step 26, the slurry formed in steps 22 and/or 24 may be applied to a current collector. In one embodiment, the slurry is applied to the current collector using a doctor blade. Other alternative means and methods for applying the slurry, such as through a slot die, or a direct or reverse gravure process, can also be used in accordance with the present invention. In one embodiment, the slurry can be applied to the current collector with a thickness of between 50 µm and 600 µm. A lesser or greater coating thickness is also possible in other embodiments, which should be limited only by the claims and their equivalents. In one embodiment, the current collector comprises an etched or roughened aluminum sheet, foil, mesh, screen, porous substrate, or the like. In one embodiment, the current collector comprises a metal, for example, copper, aluminum, silver, gold, and the like. In one embodiment, the current collector comprises a thickness of about 10-50 microns. A lesser or greater collector thickness is also possible in other embodiments, which should be limited only by the claims and their equivalents. Those skilled in the art will recognize that if the electrochemical potential allows, other metals could also be used as a collector.

Prior to applying the slurry to a current collector, an added step 28 of treating the collector to improve adhesion between the current collector and the applied slurry can be performed. In one embodiment, the current collector can be coated with a bonding agent, layer, or adhesive to improve the adhesion of the slurry to the collector. For example, carboxymethyl cellulose, melamine, phenolics, or furans can be used as a bonding agent between the collector and slurry. In one embodiment, adhesive coating sold under the trade name Electrodag$^R$ EB-012 by Acheson Colloids Company, 1600 Washington Ave., Port Huron, Mich. 48060, Telephone 1-810-984-5581 is used. Alternatively, other adhesives or bonding agents can be used and/or other methods and means for improving the adhesion between the current collector and slurry can be used, such as treating or physically roughening the surface of the current collector prior to application of the slurry.

After the slurry is applied to the collector, it can be dried during a drying step 30 to form an electrode comprising the current collector and coated slurry of dry fibrillized carbon 12, 14 and binder 16 particles. During the drying step 30, the aqueous solution is evaporated from within the slurry, which results in the formation of a conductive electrode film on the current collector. In one embodiment, the slurry is dried in an oven at 85° C. for 1 hour. Alternatively, other methods, times, and temperatures for drying the slurry can be used.

In step 32, the electrodes can be compacted to densify the conductive electrode film and further fibrillate the compounded material. In one embodiment, the film can be compacted using a calender device. A compacting and/or calendering function can be achieved by a roll-mill, calender, a belt press, a flat plate press, and the like, as well as others known to those skilled in the art. In one embodiment, the calender device may comprises a roll-mill. A high-pressure nip at the entry to the roll-mill can be set to gradually decrease the film thickness by 15% to 60% in 2 to 10 passes.

Figure 2:
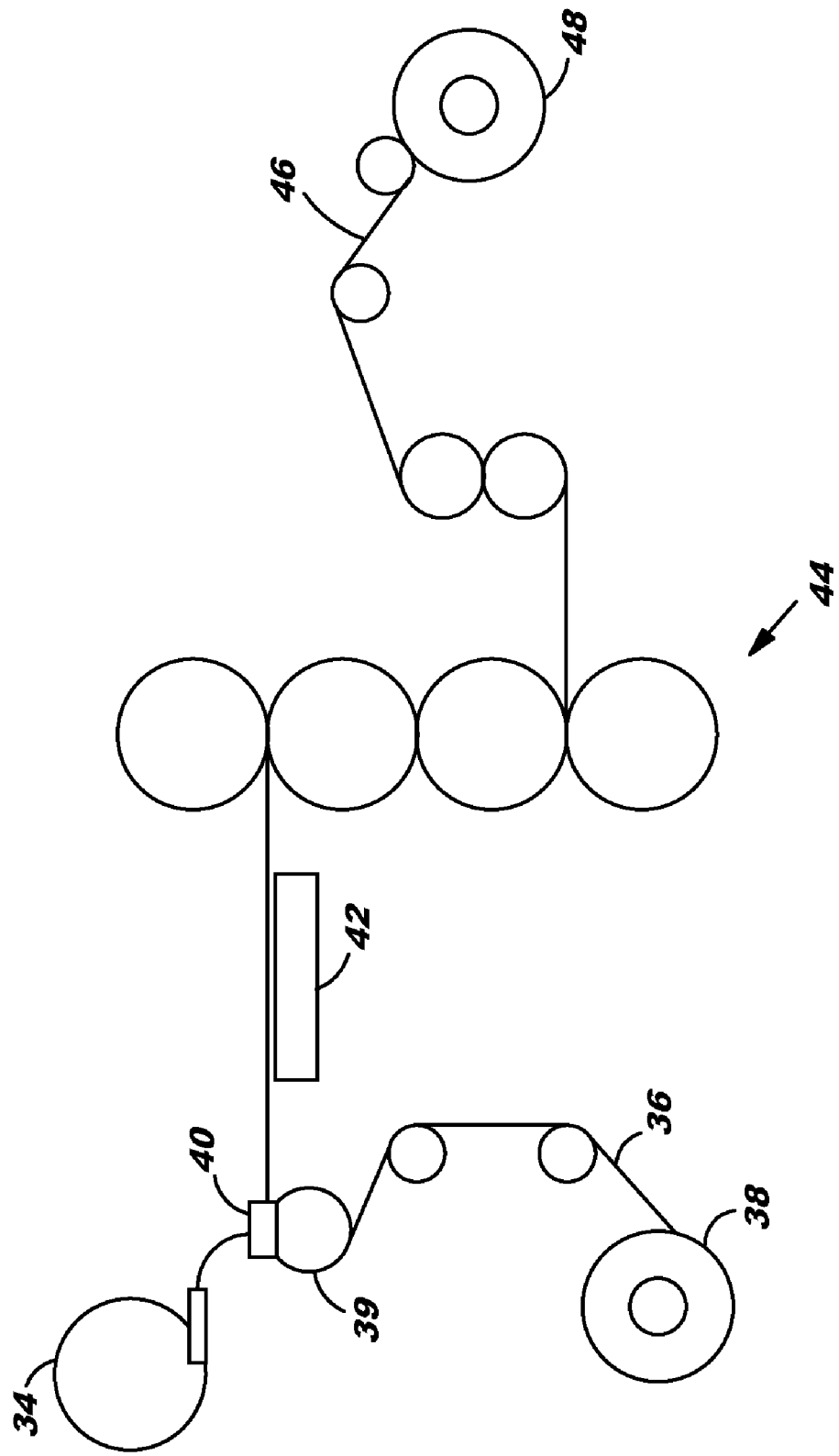
FIG. 2 shows an apparatus for forming a coated electrode.

Referring now to FIG. 2, and preceding Figures as needed, there is seen one possible apparatus for making a coating based electrode according to the present invention. In one embodiment seen in FIG. 2, a slurry or suspension made from dry fibrillized dry carbon and dry binder particles 12, 14, and 16 can be held in a suspension feeder 34, and a current collector 36 in the form a roll of aluminum foil, coated if needed with an adhesive/bonding agent, can be held on a feeding roll 38. The collector 36 may be wrapped around a roller 39, positioned beneath a coating head 40 and adjacent to the suspension feeder 34. As the collector 36 moves across the roller 39, a suspension of slurry is fed from the coating head 40 onto a surface of the collector 36. From there, the collector 36 is carried through an oven 42, which is configured for removing any of the solution(s) used. The dried slurry forms a conductive electrode film on the collector 36. Next, the collector may be fed through a series of rollers 44 configured to compact and calender the dried slurry and current collector so that densification and further fibrillization occurs. After calendaring, a finished electrode 46 is gathered on a storage roll 48 where it may be stored until it is assembled into a finished energy storage device.

Figure 3:
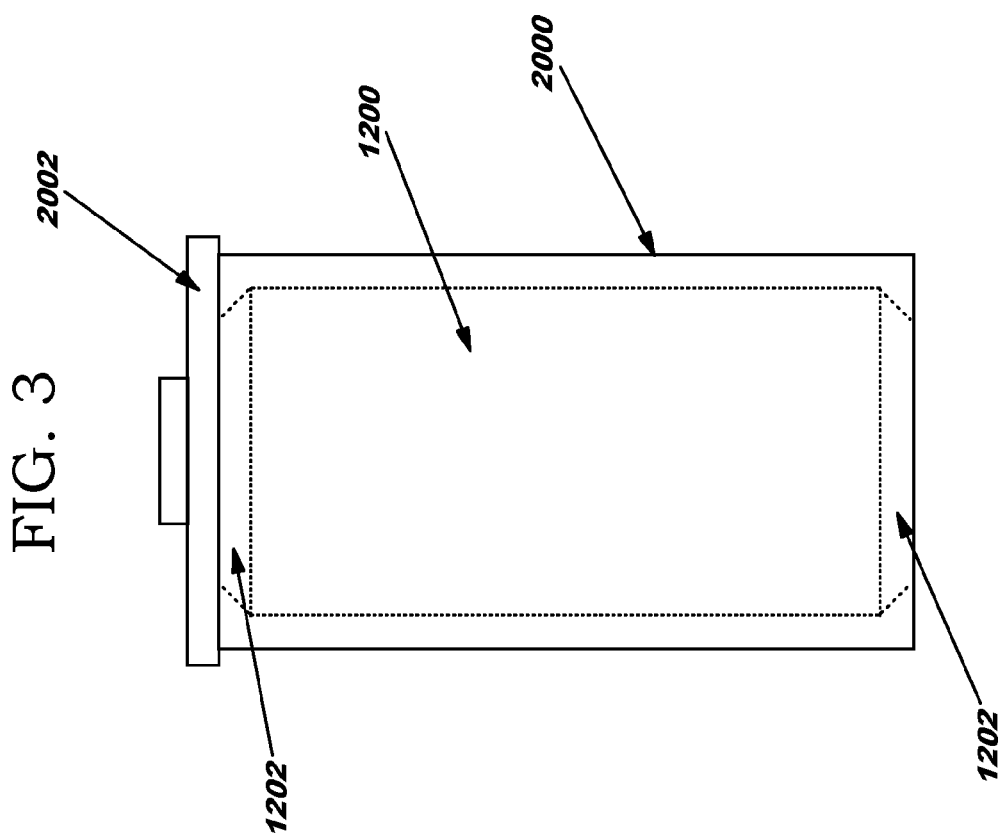
FIG. 3 is a representation of a rolled electrode coupled internally to a housing.

Referring now to FIG. 3, and preceding Figures as needed, during manufacture, one or more finished electrode 1200 coated with one or more slurry made accordance with embodiments disclosed herein is rolled into a configuration known to those in the electrode forming arts as a jellyroll. Not shown is a separator disposed within the jellyroll, which acts to separate layers of the rolled electrode 1200. The rolled electrode 1200 is inserted into an open end of a housing 2000. An insulator (not shown) is placed along a top periphery of the housing 2000 at the open end, and a cover 2002 is placed on the insulator. During manufacture, the housing 2000, insulator, and cover 2002 may be mechanically curled together to form a tight fit around the periphery of the now sealed end of the housing, which after the curling process is electrically insulated from the cover by the insulator. When disposed in the housing 2000, the electrode may be configured such that respective exposed collector extensions 1202 of the electrode make internal contact with the bottom end of the housing 2000 and the cover 2002. In one embodiment, external surfaces of the housing 2000 or cover 2002 may include or be coupled to standardized connections/connectors/terminals to facilitate electrical connection to the rolled electrode 1200 within the housing 2000. Contact between respective collector extensions 1202 and the internal surfaces of the housing 2000 and the cover 2002 may be enhanced by welding, soldering, brazing, conductive adhesive, or the like. In one embodiment, a welding process may be applied to the housing and cover by an externally applied laser welding process. In one embodiment, the housing 2000, cover 2002, and collector extensions 1202 comprise substantially the same metal, for example, aluminum. An electrolyte can be added through a filling/sealing port (not shown) to the sealed housing 1200. In one embodiment, the electrolyte is 1.5 M tetramethylammonium or tetrafluroborate in acetonitrile solvent. After impregnation and sealing, a finished product is thus made ready for commercial sale and subsequent use.

Although the particular systems and methods herein shown and described in detail are fully capable of attaining the above described objects of the invention, it is understood that the description and drawings presented herein represent some, but not all, embodiments that are broadly contemplated. Structures and methods that are disclosed may thus comprise configurations, variations, and dimensions other than those disclosed. For example, capacitors as a broad class of energy storage devices are within the scope of the present invention, as are, with appropriate technology based modifications, batteries and fuel cells. Also, different housings may comprise coin-cell type, clamshell type, prismatic, cylindrical type geometries, as well as others as are known to those skilled in the art. For a particular type of housing, it is understood that appropriate changes to electrode geometry may be required, but that such changes would be within the scope of those skilled in the art.

Thus, the scope of the present invention fully encompasses other embodiments that may become obvious to those skilled in the art and that the scope of the present invention is accordingly limited by nothing other than the appended claims and their equivalents.

What is claimed is:

1. A method of making a slurry coated electrode, the method comprising:
   dry blending dry carbon particles and dry binder to form a dry mixture comprised of the dry carbon particles and the dry binder;
   liquefying the dry mixture with a solution to form a slurry;
   applying the slurry to a current collector;
   drying the slurry; and compacting the current collector and slurry.

2. The method of claim 1, wherein the step of blending comprises a step of dry fibrillizing the mixture.

3. The method of claim 2, wherein the dry fibrillizing step comprises milling the mixture.

4. The method of claim 2, wherein the dry fibrillizing step comprises subjecting the mixture to high shear forces.

5. The method of claim 2, wherein the dry fibrillizing step utilizes a high-pressure gas.

6. The product of claim 5, wherein the high-pressure gas comprises a pressure of more than 60 PSI.

7. The product of claim 5, wherein the gas comprises a water content of no more than 20 PPM.

8. The method of claim 1, further comprising the step of treating the current collector prior to applying the slurry to improve adhesion between the current collector and slurry.

9. The method of claim 8, wherein the step of treating the current collector further comprises coating the current collector with a bonding agent prior to applying the slurry.

10. The method of claim 8, wherein the step of treating the current collector further comprises roughening a surface of the current collector prior to applying the slurry.

11. The method of claim 1, wherein the dry binder comprises a fluoropolymer.

12. The method of claim 11, wherein the fluoropolymer particles comprise PTFE.

13. The method of claim 11, wherein the mixture comprises approximately 0% to 25% conductive carbon.

14. The method of claim 11, wherein the mixture comprises approximately 0.5% to 20% fluoropolymer particles.

15. The method of claim 11, wherein the mixture comprises approximately 80% to 95% activated carbon, approximately 0% to 15% conductive carbon, and approximately 3% to 15% fluoropolymer.

16. The method of claim 1, wherein the mixture comprises conductive particles.

17. The method of claim 1, wherein the mixture comprises activated carbon particles.

18. The method of claim 1, wherein the mixture comprises approximately 50% to 99% activated carbon.

19. The method of claim 1, wherein the solution comprises deionized water.

20. The method of claim 1, wherein the current collector comprises aluminum.

21. The method of claim 1, wherein the step of applying the suspension comprises coating the current collector with the slurry using a doctor blade, a slot die, or a direct or reverse gravure process.

* * * * *

UNITED STATES PATENT AND TRADEMARK OFFICE
CERTIFICATE OF CORRECTION

PATENT NO. : 8,213,156 B2  Page 1 of 1
APPLICATION NO. : 12/620161
DATED : July 3, 2012
INVENTOR(S) : Mitchell et al.

It is certified that error appears in the above-identified patent and that said Letters Patent is hereby corrected as shown below:

Title Page; (Item 75) Inventors, at Line 3, please Change "Hermann Vincent" to --Vincent Hermann--.

Signed and Sealed this
Twenty-seventh Day of November, 2012

David J. Kappos
*Director of the United States Patent and Trademark Office*